US012606654B2

(12) United States Patent
Nakano et al.

(10) Patent No.: US 12,606,654 B2
(45) Date of Patent: Apr. 21, 2026

(54) FLUOROPOLYMER PRODUCTION METHOD AND FLUOROPOLYMER

(71) Applicant: DAIKIN INDUSTRIES, LTD., Osaka (JP)

(72) Inventors: Marina Nakano, Osaka (JP); Takuma Kawabe, Osaka (JP); Masahiro Higashi, Osaka (JP); Sumi Ishihara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 941 days.

(21) Appl. No.: 17/515,605

(22) Filed: Nov. 1, 2021

(65) Prior Publication Data

US 2022/0049029 A1 Feb. 17, 2022

Related U.S. Application Data

(63) Continuation of application No. PCT/JP2020/018710, filed on May 8, 2020.

(30) Foreign Application Priority Data

May 8, 2019 (JP) ................................ 2019-088302

(51) Int. Cl.

| | |
|---|---|
| ***C08F 114/26*** | (2006.01) |
| ***C08F 2/06*** | (2006.01) |
| ***C08F 2/38*** | (2006.01) |
| ***C08F 14/26*** | (2006.01) |
| ***C08F 214/26*** | (2006.01) |
| ***C08F 293/00*** | (2006.01) |
| ***C08K 5/38*** | (2006.01) |

(52) U.S. Cl.

CPC .............. *C08F 114/26* (2013.01); *C08F 2/06* (2013.01); *C08F 2/38* (2013.01); *C08F 14/26* (2013.01); *C08F 214/26* (2013.01); *C08F 214/262* (2013.01); *C08F 214/265* (2013.01); *C08F 293/005* (2013.01); *C08K 5/38* (2013.01); *C08F 2438/03* (2013.01)

(58) Field of Classification Search

None

See application file for complete search history.

(56) References Cited

U.S. PATENT DOCUMENTS

| | | | | |
|---|---|---|---|---|
| 5,496,901 | A | 3/1996 | DeSimone | |
| 6,503,986 | B1 * | 1/2003 | Tanaka | ................. C09K 3/1009 525/200 |
| 7,408,013 | B2 | 8/2008 | Feiring et al. | |
| 2015/0119523 | A1 | 4/2015 | Ameduri et al. | |
| 2017/0081447 | A1 | 3/2017 | Dossi et al. | |
| 2019/0389983 | A1 | 12/2019 | Ohkura et al. | |
| 2022/0348699 | A1 | 11/2022 | Nakano et al. | |

FOREIGN PATENT DOCUMENTS

| | | | | |
|---|---|---|---|---|
| CN | 109627374 | A | 4/2019 | |
| JP | 2015-514854 | A * | 5/2015 | ................ C08F 2/28 |
| JP | 2017-515948 | A | 6/2017 | |
| WO | 2014/123221 | A1 | 8/2014 | |
| WO | 2018/164147 | A1 | 9/2018 | |
| WO | WO-2018167090 | A1 * | 9/2018 | .............. C08L 27/12 |
| WO | WO-2018167091 | A1 * | 9/2018 | ......... B29C 45/0001 |
| WO | 2021/131996 | A1 | 7/2021 | |

OTHER PUBLICATIONS

Gerard Puts et al., "Conventional and RAFT Copolymerization of Tetrafluoroethylene with Isobutyl Vinyl Ether", Macromolecules, 2018, vol. 51, pp. 6724-6739.
International Search Report for PCT/JP2020/018710 dated Jul. 14, 2020 [PCT/ISA/210].
Extended European Search Report dated Jun. 16, 2023, issued in counterpart Application No. 20802973.6.
Partial Supplementary European Search Report issued Mar. 16, 2023 in counterpart European Application No. 20802973.6.
International Preliminary Report on Patentability dated Nov. 2, 2021 with a Translation of the Written Opinion of the International Searching Authority in Application No. PCT/JP2020/018710.

* cited by examiner

*Primary Examiner* — Katarzyna I Kolb
(74) *Attorney, Agent, or Firm* — Sughrue Mion, PLLC

(57) ABSTRACT

A method for producing a fluoropolymer by solution polymerization or dispersion polymerization, the method including: in the presence of an initiator, a chain transfer agent, and a solvent, (i) homopolymerizing tetrafluoroethylene; or (ii) randomly copolymerizing tetrafluoroethylene and at least one of a monomer represented by the following formula (1) or a monomer represented by the following formula (2). The chain transfer agent includes at least one selected from dithioester compounds, dithiocarbamate compounds, trithiocarbonate compounds and xanthate compounds. The fluoropolymer contains 50 to 100 mol % of a polymerized unit based on the tetrafluoroethylene. The formula (1): $CF_2{=}CR^1R^2$ wherein $R^1$ and $R^2$ are as defined herein, the formula (2): $CH_2{=}CR^3R^4$ wherein $R^3$ and $R^4$ are as defined herein.

7 Claims, No Drawings

FLUOROPOLYMER PRODUCTION METHOD AND FLUOROPOLYMER

CROSS REFERENCE TO RELATED APPLICATIONS

This application is a Rule 53(b) Continuation of International Application No. PCT/JP2020/018710 filed May 8, 2020, claiming priority based on Japanese Patent Application No. 2019-088302 filed May 8, 2019. The respective disclosures of International Application No. PCT/JP2020/018710 and Japanese Patent Application No. 2019-088302 are incorporated herein by reference in their entirety.

TECHNICAL FIELD

The disclosure relates to methods for producing a fluoropolymer and also relates to fluoropolymers.

BACKGROUND ART

The methods for producing a fluoropolymer adopt emulsion polymerization or solution polymerization.

For example, Patent Literature 1 discloses polymerization of tetrafluoroethylene (TFE), vinylidene fluoride (VDF), and hexafluoropropene (HFP) in the presence of O-ethyl-S-(1-methoxycarbonyl)ethyldithiocarbonate as a chain transfer agent and a microemulsion obtained in advance by mixing a perfluoropolyoxyalkylene having acidic end groups of formula: $CF_2ClO(CF_2—CF(CF_3)O)_n(CF_2O)_mCF_2COOH$, wherein n/m=10, having average molecular weight of 600 and perfluoropolyether of formula: $CF_3O(CF_2CF(CF_3)O)_n(CF_2O)_mCF_3$ with n/m=20 having average molecular weight of 450.

Patent Literature 2 discloses a method for preparing copolymers by controlled free-radical copolymerization, the method including copolymerizing a trifluoroethylene monomer and at least one additional monomer, different from trifluoroethylene, in the presence of an initiator and a chain transfer agent, the chain transfer agent being a xanthate compound, a trithiocarbonate compound, or a monoiodide compound. The copolymers prepared are block copolymers; the monomer(s) present during the copolymerization step consist(s) of vinylidene fluoride and trifluoroethylene or comprise(s) vinylidene fluoride, trifluoroethylene and at least one additional monomer; the molar ratio of the amount of chain transfer agent to the amount of monomers is from 0.001 to 0.020; and the initial molar ratio of the amount of the TrFE monomer to the amount of the comonomers is 10% to 90%, preferably 20% to 50%.

Patent Literature 3 discloses a method for producing a polymer by polymerization of a haloolefin in the presence of a specific organic tellurium compound.

Patent Literature 4 discloses a method in which an autoclave is charged with butyl acetate as a solvent and as a vinyl ester monomer and PERBUTYL PV (product name, available from NOF Corporation) as a polymerization initiator, the autoclave is evacuated, the tank is heated to 60° C., tetrafluoroethylene is sealed therein under stirring, and the reaction is started.

Non-Patent Literature 1 discloses alternating copolymerization of TFE and isobutyl vinyl ether by solution polymerization in an organic solvent.

CITATION LIST

Patent Literature

Patent Literature 1: JP 2017-515948 T
Patent Literature 2: JP 2015-514854 T
Patent Literature 3: WO 2018/164147
Patent Literature 4: WO 2014/123221

Non-Patent Literature

Non-Patent Literature 1: Ameduri, Macromolecules, 2018, Vol. 51, p. 6724

SUMMARY

The disclosure relates to a method for producing a fluoropolymer by solution polymerization or dispersion polymerization, the method including: in the presence of an initiator, a chain transfer agent, and a solvent, (i) homopolymerizing tetrafluoroethylene; or (ii) randomly copolymerizing tetrafluoroethylene and at least one of a monomer represented by the following formula (1) or a monomer represented by the following formula (2), the chain transfer agent including at least one selected from the group consisting of dithioester compounds, dithiocarbamate compounds, trithiocarbonate compounds, and xanthate compounds, the fluoropolymer containing 50 to 100 mol % of a polymerized unit based on the tetrafluoroethylene, the formula (1):

$$CF_2{=}CR^1R^2$$

wherein $R^1$ is H or F; $R^2$ is —Cl, —$R^a$, —$COOR^b$, —$OCOR^c$, —$CONR^d_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2{=}CR^3R^4$$

wherein $R^3$ is $R^g$, $CF_3$, or F; $R^4$ is —Cl, —$R^h$, —$COOR^i$, —$OCOR^j$, —$CONR^k_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

Advantageous Effects

The production methods of the disclosure can produce a fluoropolymer by novel methods. Also, the fluoropolymers of the disclosure are novel.

DESCRIPTION OF EMBODIMENTS

Before the specific description of the disclosure, some terms used in the description are defined or described below.

The fluororesin as used herein means a partially crystalline fluoropolymer which is a fluoroplastic. The fluororesin has a melting point and has thermoplasticity, and may be either melt-fabricable or non melt-processible.

The melt-fabricable as used herein means an ability of a polymer to be processed in a molten state using a conventional processing device such as an extruder or an injection molding machine. Thus, a melt-fabricable fluororesin usually has a melt flow rate of 0.01 to 500 g/10 min measured by a measurement method to be described later.

The fluoroelastomer as used herein means an amorphous fluoropolymer. The term "amorphous" means that a fluoropolymer has a melting peak (ΔH) of 4.5 J/g or lower determined by differential scanning calorimetry (DSC) (temperature-increasing rate: 10° C./min) or differential thermal analysis (DTA) (temperature-increasing rate: 10° C./min). The fluoroelastomer is to crosslink to exhibit elastomeric behavior. The elastomeric behavior means an ability of a polymer to be stretched and to maintain its original length when the force required to stretch the polymer is no longer applied.

The partially fluorinated elastomer as used herein means a fluoropolymer containing a fluoromonomer unit, containing a perfluoromonomer unit in an amount of less than 90 mol % of all polymerized units, having a glass transition temperature of 20° C. or lower, and having a melting peak (ΔH) of 4.5 J/g or lower.

The perfluoroelastomer as used herein means a fluoropolymer containing a perfluoromonomer unit in an amount of 90 mol % or more of all polymerized units, having a glass transition temperature of 20° C. or lower, having a melting peak (ΔH) of 4.5 J/g or lower, and having a fluorine atom concentration in the fluoropolymer of 71% by mass or more. The fluorine atom concentration in the fluoropolymer as used herein is the concentration (% by mass) of the fluorine atoms contained in the fluoropolymer calculated based on the types and amounts of the monomers constituting the fluoropolymer.

The perfluoromonomer as used herein means a monomer free from a carbon-hydrogen bond in the molecule. The perfluoromonomer may be a monomer which contains carbon atoms and fluorine atoms and in which some fluorine atoms binding to any of the carbon atoms are replaced by chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced by fluorine atoms. The perfluoromonomer does not encompass a monomer giving a crosslinking site.

The monomer giving a crosslinking site is a monomer (cure-site monomer) containing a crosslinkable group that can give a fluoropolymer a crosslinking site to form a crosslink with the use of a curing agent.

The polytetrafluoroethylene (PTFE) as used herein is preferably a fluoropolymer in which tetrafluoroethylene represents 99 mol % or more of all polymerized units.

The fluororesin other than polytetrafluoroethylene and the fluoroelastomer as used herein are each preferably a fluoropolymer in which tetrafluoroethylene represents less than 99 mol % of all polymerized units.

The amounts of the respective monomers constituting the fluoropolymer can be calculated by any appropriate combination of NMR, FT-IR, elemental analysis, and X-ray fluorescence analysis in accordance with the types of the monomers.

The term "organic group" as used herein means a group containing one or more carbon atoms or a group obtainable by removing one hydrogen atom from an organic compound.

Examples of the "organic group" include:

an alkyl group optionally containing one or more substituents, an alkenyl group optionally containing one or more substituents, an alkynyl group optionally containing one or more substituents, a cycloalkyl group optionally containing one or more substituents, a cycloalkenyl group optionally containing one or more substituents, a cycloalkadienyl group optionally containing one or more substituents, an aryl group optionally containing one or more substituents, an aralkyl group optionally containing one or more substituents, a non-aromatic heterocyclic group optionally containing one or more substituents, a heteroaryl group optionally containing one or more substituents, a cyano group, a formyl group, RaO—, RaCO—, $RaSO_2$—, RaCOO—, RaNRaCO—, $RaCONR_a$—, RaOCO—, $RaOSO_2$—, and $RaNRbSO_2$—, wherein each Ra is independently an alkyl group optionally containing one or more substituents, an alkenyl group optionally containing one or more substituents, an alkynyl group optionally containing one or more substituents, a cycloalkyl group optionally containing one or more substituents, a cycloalkenyl group optionally containing one or more substituents, a cycloalkadienyl group optionally containing one or more substituents, an aryl group optionally containing one or more substituents, an aralkyl group optionally containing one or more substituents, a non-aromatic heterocyclic group optionally containing one or more substituents, or a heteroaryl group optionally containing one or more substituents, and each Rb is independently H or an alkyl group optionally containing one or more substituents.

The organic group is preferably an alkyl group optionally containing one or more substituents.

The term "substituent" as used herein means a group which can replace another atom or group. Examples of the "substituent" include an aliphatic group, an aromatic group, a heterocyclic group, an acyl group, an acyloxy group, an acylamino group, a sulfonyl group, a fluorine-containing sulfonyl group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a sulfamoyl carbamoyl group, a carbamoyl sulfamoyl group, a dialiphatic oxyphosphinyl group, and a diaromatic oxyphosphinyl group. In these substituents, any or all of the hydrogen atoms binding to carbon atoms may be replaced by fluorine atoms.

The aliphatic group may be either saturated or unsaturated, and may contain any of a hydroxy group, an aliphatic oxy group, a carbamoyl group, an aliphatic oxycarbonyl group, an aliphatic thio group, an amino group, an aliphatic amino group, an acylamino group, a carbamoylamino group, and the like. Examples of the aliphatic group include alkyl groups containing one to eight, preferably one to four carbon atoms in total, such as a methyl group, an ethyl group, a vinyl group, a cyclohexyl group, and a carbamoylmethyl group.

The aromatic group may contain any of a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, and the like. Examples of the aromatic group include aryl groups containing six to twelve, preferably six to ten carbon atoms in total, such as a phenyl group, a 4-nitrophenyl group, a 4-acetylaminophenyl group, and a 4-methanesulfonylphenyl group.

The heterocyclic group may contain any of a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, and the like. Examples of the heterocyclic group include 5- or 6-membered heterocyclic groups containing two to twelve, preferably two to ten carbon atoms in total, such as a 2-tetrahydrofuryl group and a 2-pyrimidyl group.

The acyl group may contain any of an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, and the like. Examples of the acyl group include acyl groups containing two to eight, preferably two to four carbon atoms in total, such as an acetyl group, a propanoyl group, a benzoyl group, and a 3-pyridinecarbonyl group.

The acylamino group may contain any of an aliphatic group, an aromatic group, a heterocyclic group, and the like, and may contain any of an acetylamino group, a benzoylamino group, a 2-pyridinecarbonylamino group, a propanoylamino group, and the like, for example. Examples of the acylamino group include acylamino groups containing two to twelve, preferably two to eight carbon atoms in total, and alkylcarbonylamino groups containing two to eight carbon atoms in total, such as an acetylamino group, a benzoylamino group, a 2-pyridinecarbonylamino group, and a propanoylamino group.

The aliphatic oxycarbonyl group may be either saturated or unsaturated, and may contain any of a hydroxy group, an aliphatic oxy group, a carbamoyl group, an aliphatic oxycarbonyl group, an aliphatic thio group, an amino group, an aliphatic amino group, an acylamino group, a carbamoylamino group, and the like. Examples of the aliphatic oxycarbonyl group include alkoxycarbonyl groups containing two to eight, preferably two to four carbon atoms in total, such as a methoxycarbonyl group, an ethoxycarbonyl group, and a (t)-butoxycarbonyl group.

The carbamoyl group may contain any of an aliphatic group, an aromatic group, a heterocyclic group, and the like. Examples of the carbamoyl group include an unsubstituted carbamoyl group and alkylcarbamoyl groups containing two to nine carbon atoms in total, preferably an unsubstituted carbamoyl group and alkylcarbamoyl groups containing two to five carbon atoms in total, such as a N-methylcarbamoyl group, a N,N-dimethylcarbamoyl group, and a N-phenylcarbamoyl group.

The aliphatic sulfonyl group may be either saturated or unsaturated, and may contain any of a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, and the like. Examples of the aliphatic sulfonyl group include alkyl sulfonyl groups containing one to six, preferably one to four carbon atoms in total, such as a methanesulfonyl group.

The aromatic sulfonyl group may contain any of a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, and the like. Examples of the aromatic sulfonyl group include arylsulfonyl groups containing six to ten carbon atoms in total, such as a benzenesulfonyl group.

The amino group may contain any of an aliphatic group, an aromatic group, a heterocyclic group, and the like.

The acylamino group may contain any of an acetylamino group, a benzoylamino group, a 2-pyridinecarbonylamino group, a propanoylamino group, and the like. Examples of the acylamino group include acylamino groups containing two to twelve, preferably two to eight carbon atoms in total, more preferably alkylcarbonylamino groups containing two to eight carbon atoms in total, such as an acetylamino group, a benzoylamino group, a 2-pyridinecarbonylamino group, and a propanoylamino group.

The aliphatic sulfonamide group, the aromatic sulfonamide group, and the heterocyclic sulfonamide group may respectively be a methanesulfonamide group, a benzene sulfonamide group, and a 2-pyridinesulfonamide group, for example.

The sulfamoyl group may contain any of an aliphatic group, an aromatic group, a heterocyclic group, and the like. Examples of the sulfamoyl group include a sulfamoyl group, alkylsulfamoyl groups containing one to nine carbon atoms in total, dialkylsulfamoyl groups containing two to ten carbon atoms in total, arylsulfamoyl groups containing seven to thirteen carbon atoms in total, and heterocyclic sulfamoyl groups containing two to twelve carbon atoms in total, more preferably a sulfamoyl group, alkylsulfamoyl groups containing one to seven carbon atoms in total, dialkylsulfamoyl groups containing three to six carbon atoms in total, arylsulfamoyl groups containing six to eleven carbon atoms in total, and heterocyclic sulfamoyl groups containing two to ten carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be either saturated or unsaturated, and may contain any of a methoxy group, an ethoxy group, an i-propyloxy group, a cyclohexyloxy group, a methoxyethoxy group, and the like. Examples of the aliphatic oxy group include alkoxy groups containing one to eight, preferably one to six carbon atoms in total, such as a methoxy group, an ethoxy group, an i-propyloxy group, a cyclohexyloxy group, and a methoxyethoxy group.

The aromatic amino group and the heterocyclic amino group each may contain any of an aliphatic group, an aliphatic oxy group, a halogen atom, a carbamoyl group, a heterocyclic group ring-fused with the aryl group, and an aliphatic oxycarbonyl group, preferably any of an aliphatic group containing one to four carbon atoms in total, an aliphatic oxy group containing one to four carbon atoms in total, a halogen atom, a carbamoyl group containing one to four carbon atoms in total, a nitro group, and an aliphatic oxycarbonyl group containing two to four carbon atoms in total.

The aliphatic thio group may be either saturated or unsaturated, and examples thereof include alkylthio groups containing one to eight, more preferably one to six carbon atoms in total, such as a methylthio group, an ethylthio group, a carbamoylmethylthio group, and a t-butylthio group.

The carbamoylamino group may contain any of an aliphatic group, an aryl group, a heterocyclic group, and the like. Examples of the carbamoylamino group include a carbamoylamino group, alkylcarbamoylamino groups containing two to nine carbon atoms in total, dialkylcarbamoylamino groups containing three to ten carbon atoms in total, arylcarbamoylamino groups containing seven to thirteen carbon atoms in total, and heterocyclic carbamoylamino groups containing three to twelve carbon atoms in total, preferably a carbamoylamino group, alkylcarbamoylamino groups containing two to seven carbon atoms in total, dialkylcarbamoylamino groups containing three to six carbon atoms in total, arylcarbamoylamino groups containing seven to eleven carbon atoms in total, and heterocyclic carbamoylamino group containing three to ten carbon atoms in total, such as a carbamoylamino group, a methylcarbamoylamino group, a N,N-dimethylcarbamoylamino group, a phenylcarbamoylamino group, and a 4-pyridinecarbamoylamino group.

In the description, the numerical ranges expressed by the endpoints each include all numbers within the range (for example, the range of 1 to 10 includes 1.4, 1.9, 2.33, 5.75, 9.98, and the like).

The phrase "at least one" as used herein includes all numbers equal to or greater than 1 (e.g., at least 2, at least 4, at least 6, at least 8, at least 10, at least 25, at least 50, at least 100, and the like).

The disclosure will be specifically described hereinbelow.

The production methods of the disclosure encompass a method for producing a fluoropolymer by solution polymerization or dispersion polymerization (hereinafter, also referred to as "a first production method of the disclosure"), the method including: in the presence of an initiator, a chain transfer agent, and a solvent, (i) homopolymerizing tetrafluoroethylene; or (ii) randomly copolymerizing tetrafluoroethylene and at least one of a monomer represented by the following formula (1) or a monomer represented by the following formula (2), the chain transfer agent including at least one selected from the group consisting of dithioester compounds, dithiocarbamate compounds, trithiocarbonate compounds, and xanthate compounds, the fluoropolymer containing 50 to 100 mol % of a polymerized unit based on the tetrafluoroethylene, the formula (1):

$$CF_2{=}CR^1R^2$$

wherein $R^1$ is H or F; $R^2$ is —Cl, —$R^a$, —$COOR^b$, —$COOR^c$, —$CONR^d_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2{=}CR^3R^4$$

wherein $R^3$ is $R^g$, $CF_3$, or F; $R^4$ is —Cl, —$R^h$, —$COOR^i$, —$OCOR^j$, —$CONR^k_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

Tetrafluoroethylene-based polymers have been difficult to be used for block copolymerization. The inventors have found that fluoropolymers that enable block copolymerization, despite being TFE-based polymers, can be produced by adopting solution polymerization or dispersion polymerization as a polymerization method and a specific compound as a chain transfer agent. Thereby, the first production method of the disclosure can be achieved. The first production method of the disclosure can provide a fluoropolymer containing an end group derived from a specific chain transfer agent. Such a fluoropolymer enables block copolymerization.

The random copolymerization copolymerizes two or more monomer units so that they are randomly arranged.

The chain transfer agent includes at least one selected from the group consisting of dithioester compounds, dithiocarbamate compounds, trithiocarbonate compounds, and xanthate compound. Specific examples thereof include a dithioester represented by the formula (c1-1), a trithiocarbonate represented by the formula (c1-2) or (c1-2'), a dithiocarbonate represented by the formula (c1-3), and a xanthate represented by the formula (c1-4).

[Chem. 1]

(c1-1)

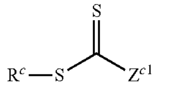

(c1-2)

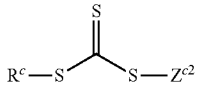

-continued (c1-2')

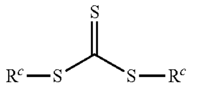

(c1-3)

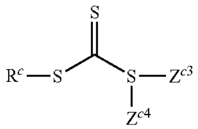

(c1-4)

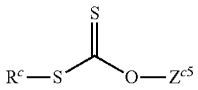

In the formulas (c1-1) to (c1-4), $Z^{c1}$ is an aryl group or an alkyl group. Examples thereof include a C6-C20 aryl group such as a phenyl group or a cyanophenyl group and a C1-C15 alkyl group such as an ethyl group. $Z^{c2}$ is an aryl group or an alkyl group. An example thereof is a C1-C15 alkyl group such as a dodecyl group. $Z^{c3}$ and $Z^{c4}$ are each independently an alkyl group, an aryl group, or a 4-pyridyl group. Examples thereof include a C1-C15 alkyl group such as a methyl group and a C6-C20 aryl group such as a phenyl group. $Z^{c3}$ and $Z^{c4}$ may bind to each other to form a heterocycle such as a pyrrole ring or a pyrrolidone ring together with a N atom in the formula (c1-3). $Z^{c5}$ is an aryl group or an alkyl group. Examples thereof include a C1-C15 alkyl group such as an ethyl group or a trifluoroethyl group and a C6-C20 aryl group such as a phenyl group or a perfluorophenyl group.

The aryl group for $Z^{c5}$ is preferably a phenyl group, a cyanophenyl group, or a perfluorophenyl group, more preferably a phenyl group or a perfluorophenyl group.

The alkyl group for $Z^{c5}$ is preferably a methyl group, an ethyl group, a butyl group, a dodecyl group, or a trifluoroethyl group, more preferably a methyl group, an ethyl group, or a trifluoroethyl group.

In the formulas (c1-1) to (c1-4), $R^c$ is a monovalent organic group. Examples thereof include (i) an alkyl group and (ii) a group prepared by replacing one or more of the hydrogen atoms of an alkyl group by at least one group selected from the group consisting of a phenyl group, a cyano group, a hydroxy group, a carboxy group, a C1-C4 alkoxycarbonyl group, a phenoxycarbonyl group, an acetoxy group, and c1 to c4 described below.

In the formula (c1-2'), two Rcs may be the same as or different from each other.

The alkyl group for $R^c$ usually has a carbon number of 1 to 18, preferably 2 to 12.

[Chem. 2]

(c1)

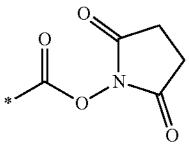

(c2)

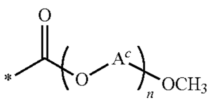

-continued (c3)

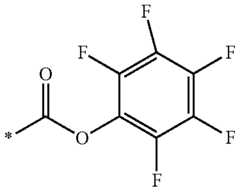

(c4)

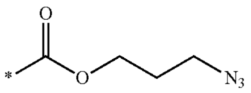

In the formulas c1 to c4, the symbol "*" indicates a binding site. In the formula c2, $A^c$ is a C2-C5 alkylene group and n is an integer of 10 to 300.

Examples of the dithioester (c1-1) include the following compounds.

[Chem. 3]

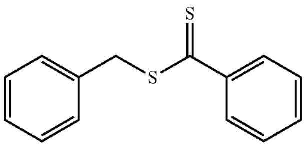

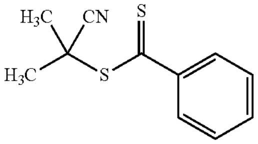

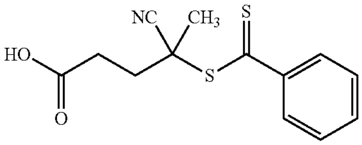

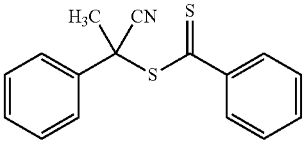

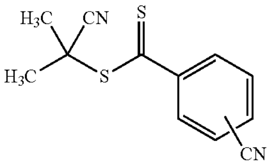

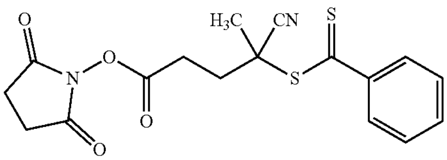

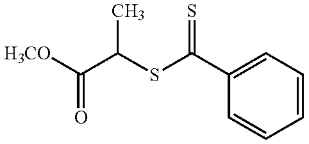

-continued
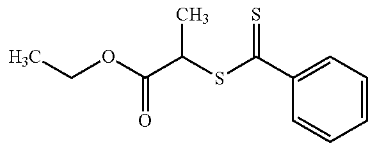
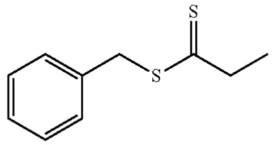
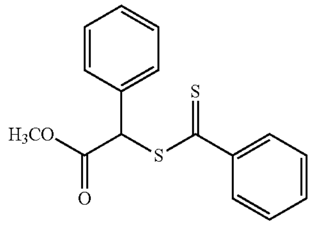
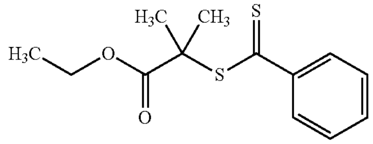
Examples of the trithiocarbonates (c1-2) and (c1-2') include the following compounds.
[Chem. 4]
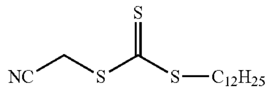
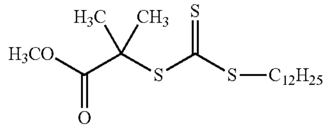
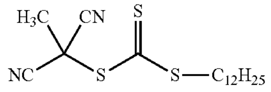
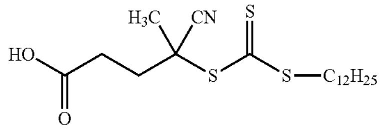
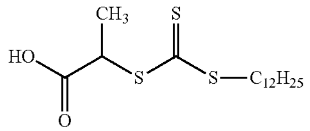
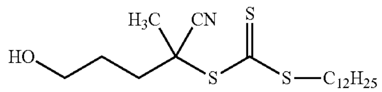
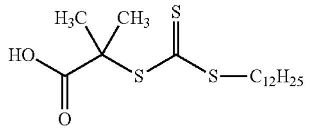
-continued
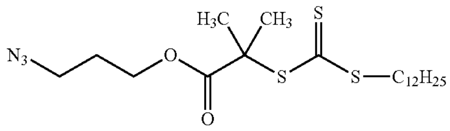
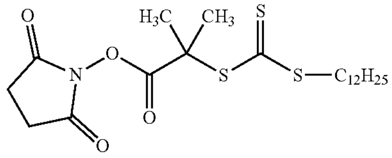
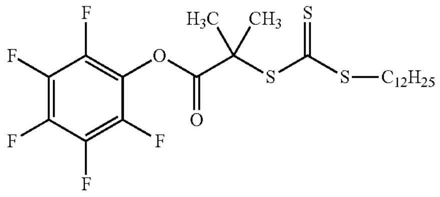
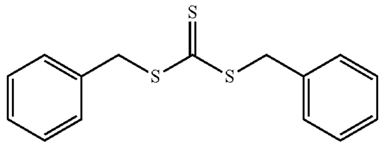
[Chem. 5]
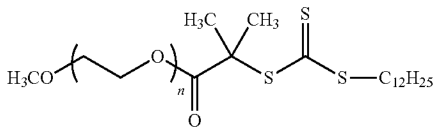
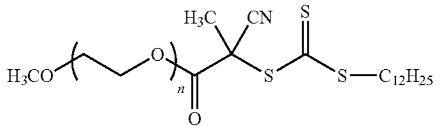
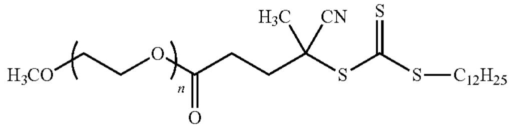
In the formula, n is an integer of 10 to 300.
Examples of the dithiocarbonate (c1-3) include the following compounds.
[Chem. 6]
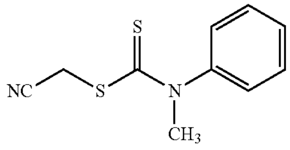
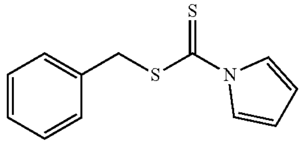

-continued
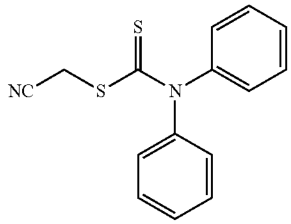
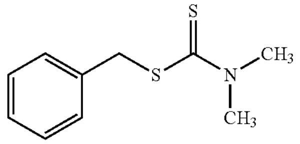
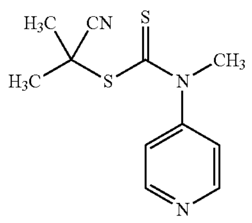
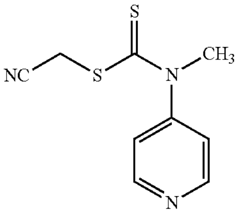
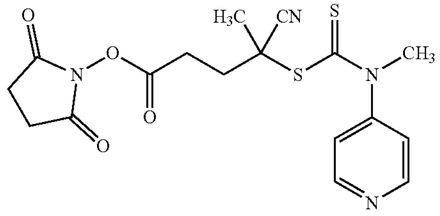
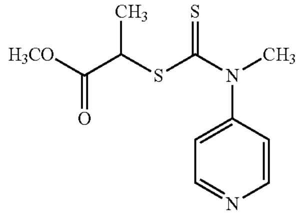
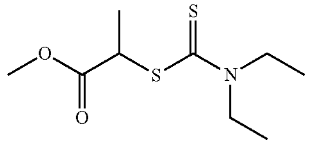
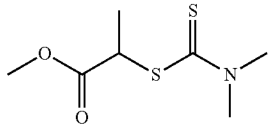
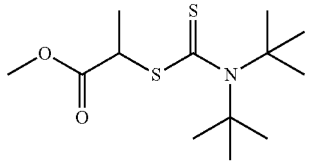
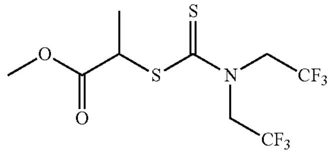
-continued
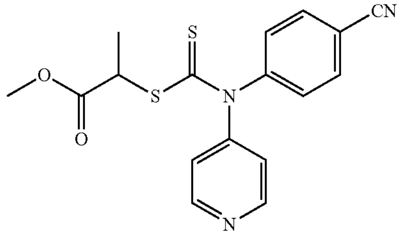
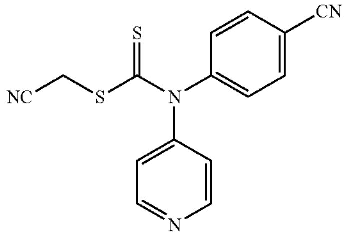
Examples of the xanthate (c1-4) include the following compounds.
[Chem. 7]
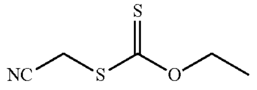
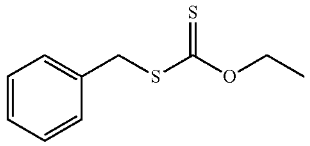
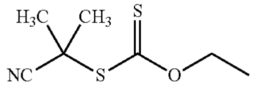
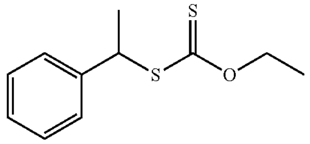
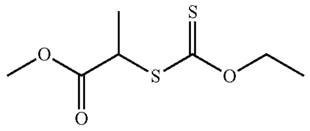
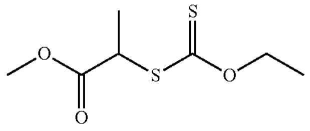
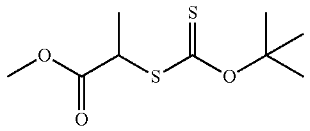
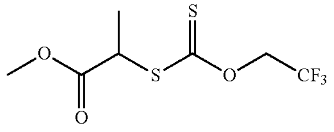

-continued

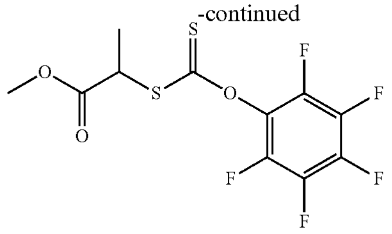

In the steps (i) and (ii), the amount of the chain transfer agent may vary depending on the chain transfer constant of the compound used. The amount of the chain transfer agent is preferably 0.05 to 20 mol % relative to all the monomers used in the polymerization. The amount of the chain transfer agent is more preferably 0.06 mol % or more, still more preferably 0.08 mol % or more, further more preferably 0.1 mol % or more. The amount is also more preferably 15 mol % or less, still more preferably 10 mol % or less, further more preferably 6.5 mol % or less.

Use of the chain transfer agent enables reversible addition-fragmentation chain transfer (RAFT) polymerization. RAFT polymerization enables living radical polymerization in the presence of the chain transfer agent.

The solution polymerization or dispersion polymerization is performed in the presence of an initiator. Examples of a suitable initiator include a peroxide initiator, an azo compound initiator, and a redox initiator.

Specific examples of the peroxide initiator include hydrogen peroxide, sodium peroxide, barium peroxide, diacylperoxides such as diacetylperoxide, disuccinylperoxide, dipropionylperoxide, dibutyrylperoxide, dibenzoylperoxide, benzoyl acetylperoxide, diglutaric acid peroxide, and dilaurylperoxide, and peracids and salts thereof (e.g., an ammonium salt, a sodium salt, and a potassium salt). Examples of the peracids include peracetic acid. Esters of peracids may also be used, and examples thereof include tert-butylperoxyacetate and tert-butylperoxypivalate.

Examples of inorganic agents include ammonium salts, alkaline salts, and alkaline earth salts of persulfuric acid, permanganic acid, or manganic acid and manganic acid. The persulfate initiator such as ammonium persulfate (APS) may be used alone or may be used in combination with a reducing agent. The reducing agent is suitably a bisulfite such as ammonium bisulfite or sodium metabisulfite, a thiosulfate such as ammonium thiosulfate, potassium thiosulfate, or sodium thiosulfate, hydrazine, azodicarboxylate, or azodicarboxyldiamide (ADA). The reducing agent may also be, for example, sodium formaldehyde sulfoxylate (Rongalit) or fluoroalkyl sulfinates disclosed in U.S. Pat. No. 5,285,002. The reducing agent typically reduces the half-life of a persulfate initiator. Further, a metal salt catalyst such as a copper salt, an iron salt, or a silver salt may be added, for example.

Examples of the azo compound include 2,2'-azobisisobutyronitrile, 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobis(2-methylbutyronitrile), 1,1'-azobis(cyclohexane-1-carbonitrile), 2-(carbamoylazo) isobutyronitrile, 2-phenylazo-4-methoxy-2,4-dimethylvaleronitrile, 2,2'-azobis(2-amidinopropane)dihydrochloride, 2,2'-azobis(N,N'-dimethyleneisobutylamidine), 2,2'-azobis (2-methyl-N-(2-hydroxyethyl)-propionamide), 2,2'-azobis (isobutyramide)dihydrate, 4,4'-azobis(4-cyanopentanoic acid), 2,2'-azobis(2-cyanopropanol), dimethyl-2,2'-azobis (2-methylpropionate), and 2,2'-azobis(2-methyl-N-(2-hydroxyethyl)propionamide).

The initiator is more preferably a peracid ester, a persulfate, diacylperoxide, 2,2'-azobis(2-methylbutyronitrile), or 2,2'-azobis(2-methylbutyronitrile), more preferably tert-butylperoxypivalate, dibenzoylperoxide, tert-butylperoxyacetate, or 2,2'-azobis(2-methylbutyronitrile).

The amount of the initiator may vary depending on the compound used and is 5.0 to 1000 mol % relative to the chain transfer agent. The amount of the initiator is preferably 6.0 mol % or more, more preferably 8.0 mol % or more, still more preferably 10 mol % or more. The amount is also preferably 100 mol % or less, more preferably 50 mol % or less, still more preferably 30 mol % or less.

The solvent is preferably a non-fluorine-based organic solvent, a fluorine-based organic solvent, or water, more preferably a non-fluorine-based organic solvent or a fluorine-based organic solvent. Examples of the fluorine-free organic solvent include esters such as n-butyl acetate, t-butyl acetate, ethyl acetate, methyl acetate, propyl acetate, and dimethyl carbonate; ketones such as acetone, methyl ethyl ketone, and cyclohexanone; aliphatic hydrocarbons such as hexane, cyclohexane, and octane; aromatic hydrocarbons such as benzene, toluene, and xylene; alcohols such as methanol, ethanol, tert-butanol, and isopropanol; cyclic ethers such as tetrahydrofuran and dioxane; dimethylsulfoxide, dimethylformamide, and any mixture thereof. Examples of the fluorine-based organic solvent include HCFC-225, tetradecafluorohexane, fluoroalkanes, hydrofluoroethers, and fluoroalcohols.

The solvent is more preferably acetone, dimethyl carbonate, ethyl acetate, methyl ethyl ketone, methanol, tetradecafluorohexane, 1,1,1,3,3-pentafluorobutane, methylnonafluorobutyl ether, methyl nonafluoroisobutyl ether, 1,1,1,2,2,3,4,5,5,5-decafluoro-3-methoxy-4-(trifluoromethyl)-pentane, 2,2,2-trifluoroethanol, or HCFC-225, still more preferably acetone, ethyl acetate, tetradecafluorohexane, 3M™ Novec™ 7100 Engineered fluid (3M Japan Limited), or ASAHIKLIN AK225 (AGC).

The polymerization temperature in the step (i) may be any temperature that enables solution polymerization or dispersion polymerization and may be 10° C. to 150° C., for example. The polymerization temperature is preferably 20° C. to 130° C., more preferably 40° C. to 110° C.

The polymerization pressure in the step (i) may be any temperature that enables solution polymerization or dispersion polymerization and may be 0.05 to 5.0 MPaG, for example. The polymerization pressure is preferably 0.2 to 3.5 MPaG, more preferably 0.5 to 1.2 MPaG.

The polymerization temperature in the step (ii) may be any temperature that enables solution polymerization or dispersion polymerization and may be 0.0° C. to 150° C., for example. The polymerization temperature is preferably 20° C. to 130° C., more preferably 40° C. to 110° C.

The polymerization pressure in the step (ii) may be any temperature that enables solution polymerization or dispersion polymerization and may be 0.0 to 9.8 MPaG, for example. The polymerization temperature is preferably 0.2 to 6.0 MPaG, more preferably 0.5 to 3.0 MPaG.

The solution polymerization and dispersion polymerization are polymerization methods of performing a polymerization reaction in a solvent.

The solution polymerization is performed using a combination of a solvent and a monomer that is soluble in the solvent and provides a polymer prepared by polymerization soluble in the solvent.

The dispersion polymerization is performed using a combination of a solvent and a monomer that is soluble in the solvent but provides a polymer prepared by polymerization insoluble in the solvent.

Accordingly, which one of solution polymerization or dispersion polymerization is adopted is determined depending on a combination of a monomer and a solvent used.

The first production method of the disclosure includes (i) homopolymerizing tetrafluoroethylene (TFE) or (ii) randomly copolymerizing TFE and at least one of a monomer represented by the following formula (1) or a monomer represented by the following formula (2).

The step (i) is homopolymerization of TFE. The homopolymerization of TFE can provide a TFE homopolymer (PTFE).

The step (ii) is random copolymerization of TFE and at least one of a monomer represented by the formula (1) or a monomer represented by the formula (2).

In the step (ii), the polymerization is preferably performed such that the fluoropolymer contains 50 mol % or more and less than 100 mol % of a polymerized unit based on TFE. The amount of the polymerized unit based on TFE is preferably 51 mol % or more, more preferably 55 mol % or more, still more preferably 60 mol % or more, particularly preferably 65 mol % or more. The amount of the polymerized unit based on TFE is preferably 99 mol % or less, more preferably 95 mol % or less, still more preferably 90 mol % or less.

The step (ii) may be to produce a modified PTFE described later. In this case, in the step (ii), the polymerization is preferably performed such that the fluoropolymer contains 0.00001 to 1.0% by mass of a combined amount of a polymerized unit based on a monomer represented by the formula (1) and a polymerized unit based on a monomer represented by the formula (2). The lower limit of the combined amount is more preferably 0.0001% by mass, still more preferably 0.001% by mass, further more preferably 0.005% by mass, particularly preferably 0.009% by mass. The upper limit thereof is preferably 0.90% by mass, more preferably 0.50% by mass, still more preferably 0.40% by mass, further more preferably 0.30% by mass, particularly preferably 0.10% by mass.

$R^a$, $R^b$, $R^c$, $R^d$, and $R^e$ in the formula (1) are the same as or different from each other and are each H or a substituent. Examples of the substituent include the groups described above. In particular, an aliphatic group, an acyl group, an aromatic group, or a heterocyclic group is preferred, an aliphatic group, an acyl group, or a heterocyclic group is more preferred, and an aliphatic group or an acyl group is still more preferred. $R^a$, $R^b$, $R^c$, $R^d$, and $R^e$ each preferably have a carbon number of 1 to 10, more preferably 1 to 8, still more preferably 1 to 5. The aliphatic group, the acyl group, the aromatic group, and the heterocyclic group each may be optionally substituted and optionally contain an oxygen atom between carbon atoms. $R^a$, $R^b$, $R^c$, $R^d$, and $R^e$ each may be linear or branched and each may contain a cyclic structure.

Examples of $Rf^a$ in the formula (1) include an optionally substituted fluorine-containing alkyl group, an optionally substituted fluorine-containing vinyl group, an optionally substituted fluorine-containing alkoxy group, and an optionally substituted fluorine-containing alkyl oxyalkyl group, each of which optionally contains an oxygen atom between carbon atoms. $Rf^a$ preferably has a carbon number of 1 to 10, more preferably 1 to 8, still more preferably 1 to 6.

$Rf^a$ may be linear or branched and may contain a cyclic structure.

$R^2$ is preferably —H, an optionally substituted C1-C10 fluorine-containing alkyl group, an optionally substituted C1-C10 fluorine-containing alkoxy group, —Cl, an optionally substituted C1-C10 fluorine-free alkyl group, a carboxy group, an optionally substituted C1-C10 alkyl ester group, or an optionally substituted C1-C10 fluorine-containing alkyl oxyalkyl group, preferably —H, $—CF_3$, $—OCF_3$, $—OCF_2CF_2SO_2F$, —Cl, $—CH_3$, $—OCH_2CF_3$, —COON, $—COOCH_3$, $—OCF_2OCF_3$, $—OCF_2CF_2OCF_3$, $—OCF_2CF_2CF_2OCF_3$, or $—OC_3F_7$, more preferably —H, $—CF_3$, $—OCF_3$, $—OC_3F_7$, or $—OCF_2CF_2SO_2F$, still more preferably —H, $—CF_3$, or $—OCF_3$.

The monomer represented by the formula (1) preferably includes at least one selected from the group consisting of hexafluoropropylene (HFP), chlorotrifluoroethylene (CTFE), vinylidene fluoride (VDF), trifluoroethylene, fluoroalkyl vinyl ether, trifluoropropylene, pentafluoropropylene, trifluorobutene, tetrafluoroisobutene, and hexafluoroisobutene.

The fluoroalkyl vinyl ether preferably includes at least one selected from the group consisting of:

a fluoromonomer represented by the formula (110):

$$CF_2{=}CF{—}ORf^{111}$$

wherein $Rf^{111}$ is a perfluoroalkyl group optionally containing an oxygen atom;

a fluoromonomer represented by the formula (120):

$$CF_2{=}CF{—}OCH_2{—}Rf^{121}$$

wherein $Rf^{121}$ is a C1-C5 perfluoroalkyl group;

a fluoromonomer represented by the formula (130):

$$CF_2{=}CFOCF_2ORf^{131}$$

wherein $Rf^{131}$ is a C1-C6 linear or branched perfluoroalkyl group, a C5-C6 cyclic perfluoroalkyl group, or a C2-C6 linear or branched perfluorooxyalkyl group containing 1 to 3 oxygen atoms; and a fluoromonomer represented by the formula (140):

$$CF_2{=}CFO(CF_2CF(Y^{141})O)_m(CF_2)_nF$$

wherein $Y^{141}$ is a fluorine atom or a trifluoromethyl group; m is an integer of 1 to 4; and n is an integer of 1 to 4.

An example of the fluoromonomer represented by the formula (110) is a fluoromonomer in which $Rf^{111}$ is a C1-C10 perfluoroalkyl group. The perfluoroalkyl group preferably has a carbon number of 1 to 5.

Examples of the perfluoroalkyl group in the formula (110) include a perfluoromethyl group, a perfluoroethyl group, a perfluoropropyl group, a perfluorobutyl group, a perfluoropentyl group, and a perfluorohexyl group.

The examples of the fluoromonomer represented by the formula (110) also include those represented by the formula (110) in which $Rf^{111}$ is a C4-C9 perfluoro(alkoxyalkyl) group; those represented by the formula (110) in which $Rf^{111}$ is a group represented by the following formula:

[Chem. 8]

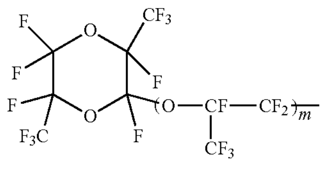

(wherein m is 0 or an integer of 1 to 4); and those represented by the formula (110) in which $Rf^{111}$ is a group represented by the following formula:

[Chem. 9]

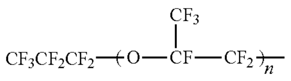

(wherein n is an integer of 1 to 4).

The fluoromonomer represented by the formula (110) is preferably a fluoromonomer represented by the formula (160): $CF_2{=}CF{-}ORf^{161}$ wherein $Rf^{161}$ is a C1-C10 perfluoroalkyl group. $Rf^{161}$ is preferably a C1-05 perfluoroalkyl group.

The fluoroalkyl vinyl ether preferably includes at least one selected from the group consisting of fluoromonomers represented by any of the formulas (110), (130), and (140).

The fluoromonomer represented by the formula (110) preferably includes at least one selected from the group consisting of perfluoro(methyl vinyl ether), perfluoro(ethyl vinyl ether), and perfluoro(propyl vinyl ether), more preferably at least one selected from the group consisting of perfluoro(methyl vinyl ether) and perfluoro(propyl vinyl ether).

The fluoromonomer represented by the formula (130) preferably includes at least one selected from the group consisting of $CF_2{=}CFOCF_2OCF_3$, $CF_2{=}CFOCF_2OCF_2CF_3$, and $CF_2{=}CFOCF_2OCF_2CF_{2}OCF_3$.

The fluoromonomer represented by the formula (140) preferably includes at least one selected from the group consisting of $CF_2{=}CFOCF_2CF(CF_3)O(CF_2)_3F$, $CF_2{=}CFO(CF_2CF(CF_3)O)_2(CF_2)_3F$, and $CF_2{=}CFO(CF_2CF(CF_3)O)_2(CF_2)_2F$.

Examples of the monomer represented by the formula (1) include a monomer represented by the formula (200):

$$CF_2{=}CF{-}O{-}(CF_2)_n\text{-}A$$

(wherein n is an integer of 1 to 10, and A is $-CH_2OH$, $-COOM$, $-SO_3M$, or $-OSO_3M$, where M is $-H$, a metal atom, $-NR^7{}_4$, optionally substituted imidazolium, optionally substituted pyridinium, or optionally substituted phosphonium, with $R^7$ being H or an organic group), and a monomer represented by the formula (210): $CF_2{=}CF{-}O{-}(CF_2CFX^1O)_n{-}CF_2CF_2\text{-}A$ (wherein n is an integer of 1 to 10, $X^1$ is F or $CF_3$, and A is defined as described above).

In the formulas (200) and (210), n is preferably an integer of 5 or less. $X^1$ is preferably $-CF_3$.

$R^7$ is preferably H or a C1-C10 organic group, more preferably H or a C1-C4 organic group, still more preferably H or a C1-C4 alkyl group.

Examples of the metal atom include alkali metals (Group 1) and alkaline earth metals (Group 2). Preferred is Na, K, or Li.

M is preferably $-H$, a metal atom, or $-NR^7{}_4$, more preferably $-H$, an alkali metal (Group 1), an alkaline earth metal (Group 2), or $-NR^7{}_4$, still more preferably $-H$, $-Na$, $-K$, $-Li$, or $-NH_4$.

The examples of the monomer represented by the formula (1) also include a monomer represented by the formula (220):

[Chem. 10]

(220)

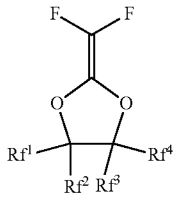

(wherein $Rf^1$, $Rf^2$, $Rf^3$, and $Rf^4$ are the same as or different from each other and are each F or a C1-C10 perfluoroalkyl group) and a monomer represented by the following formula (230):

[Chem. 11]

(230)

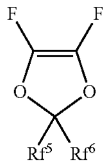

(wherein $Rf^5$ and $Rf^6$ are each F or a C1-C10 perfluoroalkyl group).

The monomer represented by the formula (1) is preferably vinylidene fluoride, hexafluoropropylene, perfluoro(methyl vinyl ether), perfluorosulfonyl vinyl ether, trifluoroethylene, chlorotrifluoroethylene, or trifluoropropylene, more preferably vinylidene fluoride, hexafluoropropylene, perfluoro(methyl vinyl ether), perfluorosulfonyl vinyl ether, or trifluoropropylene, still more preferably vinylidene fluoride, hexafluoropropylene, perfluoro(methyl vinyl ether), or perfluorosulfonyl vinyl ether.

The monomer represented by the formula (1) is a monomer different from TFE.

In the formula (2), $R^g$ and $R^h$ are the same as or different from each other and are each H, an optionally substituted hydrocarbon group, or an optionally substituted heterocyclic group. Examples of the hydrocarbon group include an alkyl group, an alkylene group, an aryl group, and a vinyl group. The hydrocarbon group preferably has a carbon number of 1 to 20, more preferably 1 to 15, still more preferably 1 to 10.

The heterocyclic group is preferably a group containing a C2-C7 lactam structure, more preferably a group containing a C3-C6 lactam structure, still more preferably a group containing a C4 lactam structure. $R^g$ and $R^h$ may be linear or branched and may contain a cyclic structure.

$R^i$, $R^j$, $R^k$, and $R^m$ in the formula (2) are the same as or different from each other and are each H or a substituent. Examples of the substituent include the groups described above. In particular, an aliphatic group, an acyl group, an aromatic group, or a heterocyclic group is preferred, an aliphatic group, an acyl group, or a heterocyclic group is more preferred, and an aliphatic group or an acyl group is still more preferred. The aliphatic group, the acyl group, the aromatic group, and the heterocyclic group each may be an optionally substituted group optionally containing an oxygen atom between carbon atoms. $R^i$, $R^j$, $R^k$, and $R^m$ each preferably have a carbon number of 1 to 20, more preferably 1 to 15, still more preferably 1 to 10.

$R^i$, $R^j$, $R^k$, and $R^m$ each may be linear or branched and each may contain a cyclic structure.

Examples of $Rf^c$ in the formula (2) include an optionally substituted fluorine-containing alkyl group, an optionally substituted fluorine-containing vinyl group, an optionally substituted fluorine-containing alkoxy group, and an optionally substituted fluorine-containing alkyl oxyalkyl group, each of which optionally contains an oxygen atom between carbon atoms. $Rf^c$ preferably has a carbon number of 1 to 10, more preferably 1 to 8, still more preferably 1 to 6.

$Rf^c$ may be linear or branched and may contain a cyclic structure.

$R^3$ is preferably H, F, $CH_3$, or $CF_3$, more preferably H, F, or $CF_3$.

$R^4$ is preferably an optionally substituted C1-C10 fluorine-free alkyl group, an optionally substituted C1-C10 fluorine-containing alkyl group, $—COOR^i$, $—OCOR^j$, $—CONR^k_2$, $—NR^xCOR^y$, $—NR^z_2$, or a group having a C2-C7 lactam structure.

$R^x$, $R^y$, and $R^z$ are the same as or different from each other and are each H or a C1-C10 alkyl group.

Examples of the monomer represented by the formula (2) include alkenes such as ethylene, propylene, butylene, and isobutylene; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl-p-t-butylbenzoate, vinyl cyclohexanecarboxylate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The examples of the monomer represented by the formula (2) also include (meth)acrylic acid esters such as methylacrylate, ethylacrylate, methylmethacrylate, and ethylmethacrylate; itaconic acid; glycidyl group-containing fluorine-free monomers such as glycidyl vinyl ether and glycidyl allyl ether; amino group-containing fluorine-free monomers such as aminoalkyl vinyl ether and aminoalkyl allyl ether; and amide bond-containing fluorine-free monomers such as (meth)acrylamide and methylol acrylamide.

The examples of the monomer represented by the formula (2) also include vinyl fluoride, a fluoroalkyl ethylene, a fluoromonomer represented by the formula (100): $CH_2{=}CFRf^{101}$ (wherein $Rf^{101}$ is a C1-C12 linear or branched fluoroalkyl group), a fluoromonomer represented by the formula (300): $CH_2{=}CFCF_2—O—(CF(CF_3)CF_2O)_n—CF(CF_2)$-A (wherein n is 0 or an integer of 1 to 10, A is $—CH_2OH$, —COOM, $—SO_3M$, or $—OSO_3M$, where M is —H, a metal atom, $—NR^7_4$, an optionally substituted imidazolium, an optionally substituted pyridinium, or an optionally substituted phosphonium, with $R^7$ being H or an organic group), and a fluorine-containing acrylate monomer.

In the formula (300), n is preferably 0 or an integer of 1 to 5, more preferably 0, 1, or 2, still more preferably 0 or 1. $R^7$ is preferably H or a C1-C10 organic group, more preferably H or a C1-C4 organic group, still more preferably H or a C1-C4 alkyl group. Examples of the metal atom include alkali metals (Group 1) and alkaline earth metals (Group 2). Preferred is Na, K, or Li. M is preferably —H, a metal atom, or $—NR^7_4$, more preferably —H, an alkali metal (Group 1), an alkaline earth metal (Group 2), or $—NR^7_4$, still more preferably —H, —Na, —K, —Li, or $—NH_4$.

The fluoromonomer represented by the formula (100) is preferably a fluoromonomer in which $Rf^{101}$ is a linear fluoroalkyl group, more preferably a fluoromonomer in which $Rf^{101}$ is a linear perfluoroalkyl group. $Rf^{101}$ preferably has a carbon number of 1 to 6. Examples of the fluoromonomer represented by the formula (100) include $CH_2{=}CFCF_3$, $CH_2{=}CFCF_2CF_3$, $CH_2{=}CFCF_2CF_2CF_3$, $CH_2{=}CFCF_2CF_2CF_2H$, and $CH_2{=}CFCF_2CF_2CF_2CF_3$. Preferred among these is 2,3,3,3-tetrafluoropropylene represented by $CH_2{=}CFCF_3$.

The fluoroalkyl ethylene is preferably a fluoroalkyl ethylene represented by the following formula (170):

$$CH_2{=}CH—(CF_2)_n—X^{171}$$

(wherein $X^{171}$ is H or F; and n is an integer of 3 to 10), more preferably includes at least one selected from the group consisting of $CH_2{=}CH—C_4F_9$ and $CH_2{=}CH—C_6F_{13}$.

The fluorine-containing acrylate monomer is preferably represented by the formula (240):

$$CH_2{=}C(—X^{241})—C({=}O)—O—Y^{241}—Rf^{241}$$

wherein $X^{241}$ is H, $CH_3$, F, or Cl; $Y^{241}$ is a single bond or an aliphatic group having a carbon number of 1 or greater; and $Rf^{241}$ is a C1-C8 aliphatic group or a C1-C8 fluoroalkyl group.

$Y^{241}$ may be, for example, a C1-C20 linear or branched aliphatic group, particularly an alkylene group, and may be a group represented by the formula $—(CH_2)^x—$, wherein x is 1 to 10.

$Rf^{241}$ is preferably a perfluoroalkyl group. $Rf^{241}$ preferably has a carbon number of 4 to 8, more preferably 4 to 6. Examples of $Rf^{241}$ include $—CF_2CF_2CF_2CF_3$, $—CF_2CF(CF_3)_2$, $—C(CF_3)_3$, $—(CF_2)_4CF_3$, $—(CF_2)_2CF(CF_3)_2$, $—CF_2C(CF_3)$ 3, $—CF(CF_3)CF_2CF_2CF_3$, $—(CF_2)_5CF_3$, $—(CF_2)_3CF(CF_3)_2$, $—(CF_2)_4CF(CF_3)_2$, and $—C_8F_{17}$.

Non-limiting specific examples of the fluorine-containing acrylate monomer include monomers represented by the following formulas:

$$CH_2{=}C(—H)—C({=}O)—O—(CH_2)_2—Rf^{241},$$

$$CH_2{=}C(—CH_3)—C({=}O)—O—(CH_2)_2—Rf^{241}, \text{ and}$$

$$CH_2{=}C(—Cl)—C({=}O)—O—(CH_2)_2—Rf^{241},$$

wherein $Rf^{241}$ is as described above.

The amide bond-containing fluorine-free monomer is preferably a monomer containing $—CONR^k_2$, $—NR_xCOR^y$, or a group having a C2-C7 lactam structure, for example. The amide bond indicates a bond between a carbonyl group and a nitrogen atom.

Examples of the amide bond-containing fluorine-free monomer include N-vinyl lactam compounds such as N-vinyl-3-propiolactam, N-vinyl-2-pyrrolidone, N-vinyl-γ-valerolactam, N-vinyl-2-piperidone, and N-vinyl-heptolactam; acyclic N-vinylamide compounds such as N-vinyl formamide and N-methyl-N-vinyl acetamide; acyclic N-allylamide compounds such as N-allyl-N-methylformamide and allyl urea; N-allyl lactam compounds such as 1-(2-propenyl)-2-pyrrolidone; and acrylamide compounds such as (meth)acrylamide, N,N-dimethylacrylamide, and N-isopropylacrylamide.

Examples of the amide bond-containing fluorine-free monomer also include a compound represented by the following formula:

[Chem. 12]

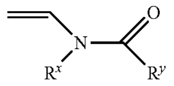

(wherein $R^x$ and $R^y$ are each independently H or a C1-C10 alkyl group) and a compound represented by the following formula:

[Chem. 13]

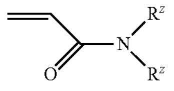

(wherein $R^z$s are each independently H or a C1-C10 alkyl group).

Preferred among these amide bond-containing fluorine-free monomers are N-vinyl lactam compounds and acyclic N-vinylamide compounds, more preferred is at least one selected from the group consisting of N-vinyl-β-propiolactam, N-vinyl-2-pyrrolidone, N-vinyl-γ-valerolactam, N-vinyl-2-piperidone, and N-vinyl-heptolactam, still more preferred is at least one selected from the group consisting of N-vinyl-2-pyrrolidone and N-vinyl-2-piperidone, and particularly preferred is N-vinyl-2-pyrrolidone.

$R^4$ is preferably $—OCOCH_3$, —H, $—COOCH_3$, —NH$(C_3H_7)$, $—C_4F_9$, $—CH_3$, or a group represented by the following formula (3):

[Chem. 14]

(3)

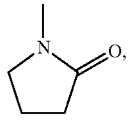

more preferably $—OCOCH_3$, —H, $—COOCH_3$, or a group represented by the formula (3), still more preferably $—OCOCH_3$, —H, or a group represented by the formula (3).

The monomer represented by the formula (2) is preferably a vinyl ester, a (meth)acrylic acid ester, an alkene, an amide bond-containing fluorine-free monomer, a fluoroalkyl ethylene, or a fluorine-containing acrylate monomer, more preferably a vinyl ester, a (meth)acrylic acid ester, an alkene, a N-acrylamide compound, a N-vinylamide compound, a N-vinyl lactam compound, a fluoroalkyl ethylene, or a fluorine-containing acrylate monomer, still more preferably vinyl acetate, N-vinylpyrrolidone, ethylene, methylacrylate, N-isopropylacrylamide, or $CH_2═CH—C_4F_9$, still more preferably vinyl acetate, N-vinylpyrrolidone, ethylene, or methylacrylate.

In particular, the monomer represented by the formula (1) or the monomer represented by the formula (2) preferably includes at least one selected from the group consisting of HFP, CTFE, VDF, vinyl fluoride, trifluoroethylene, fluoroalkyl vinyl ethers, trifluoropropylene, pentafluoropropylene, trifluorobutene, tetrafluoroisobutene, hexafluoroisobutene, vinyl esters, (meth)acrylic acid esters, alkenes, amide bond-containing fluorine-free monomers, fluoroalkyl ethylenes, and fluorine-containing acrylate monomers; more preferably includes at least one selected from the group consisting of HFP, CTFE, VDF, fluoroalkyl vinyl ethers, trifluoropropylene, pentafluoropropylene, trifluorobutene, tetrafluoroisobutene, hexafluoroisobutene, vinyl esters, (meth)acrylic acid esters, N-acrylamide compounds, alkenes, N-vinylamide compounds, N-vinyl lactam compounds, fluoroalkyl ethylenes, and fluorine-containing acrylate monomers; still more preferably include at least one selected from the group consisting of HFP, VDF, perfluoro(methyl vinyl ether), perfluorosulfonyl vinyl ether, ethylene, N-vinylamide compounds, N-vinyl lactam compounds, and vinyl acetate; particularly preferably include at least one selected from the group consisting of HFP, VDF, perfluoro(methyl vinyl ether), perfluorosulfonyl vinyl ether, ethylene, N-vinylamide compounds, N-vinylpyrrolidone, and vinyl acetate.

Examples of the fluoropolymer obtainable by the first production method of the disclosure include a first fluoropolymer of the disclosure and a second fluoropolymer of the disclosure described below.

The fluoropolymers of the disclosure encompass a fluoropolymer represented by Af-CRP (hereinafter, also referred to as "a first fluoropolymer of the disclosure"), wherein Af is a fluoropolymer segment consisting of a monomer unit derived from tetrafluoroethylene or a fluoropolymer segment prepared by randomly copolymerizing a monomer unit derived from tetrafluoroethylene and at least one of a monomer unit derived from a monomer represented by the formula (1) or a monomer unit derived from a monomer represented by the formula (2), and CRP is represented by any of the following formulas (CRP1) to (CRP5), the fluoropolymer containing 50 to 100 mol % of a polymerized unit based on the tetrafluoroethylene, the formula (CRP1):

$$—SC(S)Z^{c11}$$

wherein $Z^{c11}$ is an alkyl group or an aryl group, the formula (CRP2):

$$—SC(S)SZ^{c12}$$

wherein $Z^{c12}$ is an alkyl group or an aryl group, the formula (CRP3):

$$—SC(S)SR^{c11}$$

wherein $R^{c11}$ is a monovalent organic group, the formula (CRP4):

$$—SC(S)NZ^{c13}{}_2$$

wherein (i) two Zcns are each independently an alkyl group, an aryl group, or a 4-pyridyl group or (ii) two $Z^{c13}$s bind to each other to form a heterocycle together with a N atom in the formula, and the formula (CRP5):

$$—SC(S)OZ^{c14}$$

wherein $Z^{c14}$ is an alkyl group or an aryl group,

Tetrafluoroethylene-based polymers have been difficult to be used for block copolymerization. The first fluoropolymer of the disclosure containing any of the specific groups described above at an end can be used for block copolymerization. Such a first fluoropolymer of the disclosure is useful as an intermediate to produce block copolymers.

The first fluoropolymer of the disclosure can also be used as it is for applications described later as well as used as an intermediate.

Examples of $Z^{c11}$ in the formula (CRP1) include the above-described groups for $Z^{c1}$ in the formula (c1-1).

Examples of $Z^{c12}$ in the formula (CRP2) include the above-described groups for $Z^{c2}$ in the formula (c1-2).

Examples of $R^{c11}$ in the formula (CRP3) include the above-described groups for $R^c$ in the formula (c1-2').

Examples of $Z^{c13}$ in the formula (CRP4) include the above-described groups for $Z^{c3}$ and $Z^{c4}$ in the formula (c1-3).

Examples of $Z^{c14}$ in the formula (CRP5) include the above-described groups for $Z^{c5}$ in the formula (c1-4).

CRP5 is preferred among the CRPs in terms of polymerization rate.

The groups of the formulas (CRP1) to (CRP5) are groups derived from the chain transfer agents described for the first production method of the disclosure. In other words, the groups of the formulas (CRP1) to (CRP5) each constitute a portion in which part of a chain transfer agent is incorporated in a fluoropolymer (preferably a chain end of a fluoropolymer).

The first fluoropolymer of the disclosure contains 50 to 100 mol % of a polymerized unit based on tetrafluoroethylene. The polymerized unit based on tetrafluoroethylene is preferably 51 to 100 mol %, more preferably 55 to 100 mol %, still more preferably 60 to 100 mol %, particularly preferably 65 to 100 mol %.

In an embodiment of the disclosure, Af is a fluoropolymer segment consisting of a monomer unit derived from tetrafluoroethylene.

The fluoropolymer in which Af is a fluoropolymer segment consisting of a monomer unit derived from tetrafluoroethylene is so-called PTFE. The following describes PTFE.

PTFE obtained by the production method of the disclosure may be a low-molecular-weight PTFE or a high-molecular-weight PTFE.

A low-molecular-weight PTFE having a molecular weight of 600,000 or less (also referred to as PTFE micropowder) has excellent chemical stability and a very low surface energy, and is less likely to generate fibrils. Thus, such a low-molecular-weight PTFE can suitably be used as an additive for improving the lubricity and the texture of the film surface in production of plastics, inks, cosmetics, coating materials, greases, parts of office automation equipment, and toners (e.g., see JP H10-147617 A).

In the case of using as powder a low-molecular-weight PTFE obtained by the polymerization, the PTFE dispersion may be subjected to agglomeration to provide powder particles.

The high-molecular-weight PTFE as used herein means a PTFE having non melt-processability and a fibrillation ability. The low-molecular-weight PTFE as used herein means a PTFE having melt-fabricability and no fibrillation ability.

The non melt-processability means a feature of a polymer that the melt flow rate thereof cannot be measured at a temperature higher than the crystal melting point in conformity with ASTM D1238 and D2116.

The presence or absence of the fibrillation ability can be determined by "paste extrusion", a representative method of molding a "high-molecular-weight PTFE powder" which is a powder of a TFE polymer. The ability of a high-molecular-weight PTFE to be paste-extruded is owing to the fibrillation ability thereof. If a non-sintered molded article obtained by paste extrusion shows substantially no strength or elongation (for example, if it shows an elongation of 0% and is broken when stretched), it can be considered as non-fibrillatable.

The high-molecular-weight PTFE preferably has a standard specific gravity (SSG) of 2.130 to 2.280. The standard specific gravity is determined by the water replacement method in conformity with ASTM D792 using a sample prepared in conformity with ASTM D4895-89. The "high-molecular-weight" means that the standard specific gravity is within the above range.

The low-molecular-weight PTFE has a complex viscosity of $1\times10^2$ to $7\times10^3$ Pa·s at 380° C. The "low-molecular-weight" means that the complex viscosity is within the above range.

The high-molecular-weight PTFE has a complex viscosity significantly higher than that of the low-molecular-weight PTFE, and the complex viscosity thereof is difficult to measure accurately. The complex viscosity of the low-molecular-weight PTFE is measurable, but the low-molecular-weight PTFE has difficulty in providing a molded article to be used in measurement of the standard specific gravity. Thus, the standard specific gravity thereof is difficult to measure accurately. Accordingly, the standard specific gravity is used as an index of the molecular weight of the high-molecular-weight PTFE, while the complex viscosity is used as an index of the molecular weight of the low-molecular-weight PTFE. For both the high-molecular-weight PTFE and the low-molecular-weight PTFE, no measurement methods for directly specifying the molecular weight have been known so far.

The high-molecular-weight PTFE preferably has a peak temperature of 333° C. to 347° C., more preferably 335° C. to 345° C. The low-molecular-weight PTFE preferably has a peak temperature of 322° C. to 333° C., more preferably 324° C. to 332° C. The peak temperature is the temperature corresponding to the maximum value on a heat-of-fusion curve with a temperature-increasing rate of 10° C./min using a differential scanning calorimeter (DSC) for a PTFE which has never been heated up to 300° C. or higher.

Preferably, the high-molecular-weight PTFE has at least one endothermic peak in a temperature range of 333° C. to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290° C. to 350° C. calculated from the heat-of-fusion curve.

The PTFE can be used in the form of an aqueous dispersion or fine powder.

The PTFE fine powder is preferred for molding. Examples of preferred applications thereof include tubes for hydraulic systems or fuel systems of aircraft or automobiles, flexible hoses for chemicals or vapors, and electric wire coating.

The aqueous dispersion of the PTFE may be mixed with a nonionic surfactant so that the aqueous dispersion is stabilized and more concentrated. In accordance with the purpose, preferably, such an aqueous dispersion may be mixed with organic or inorganic filler to form a composition and used in a variety of applications. The composition, when applied to a metal or ceramic substrate, can provide a film having non-stickiness, a low coefficient of friction, and excellent gloss, smoothness, abrasion resistance, weather resistance, and heat resistance. Thus, the composition is suitable for coating of rolls and cooking utensils and impregnation of glass cloth.

The aqueous dispersion may be formed into an organosol of the PTFE. The organosol can contain the PTFE and an organic solvent. Examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethyl acetamide. The organosol may be prepared by the method disclosed in WO 2012/002038, for example.

The aqueous dispersion of the PTFE or the fine powder of the PTFE is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the PTFE or the fine powder of the PTFE is also preferably used as a binding agent for batteries or used for dustproof applications.

The PTFE fine powder obtained by the production method of the disclosure may be used to produce unsintered tape (green tape).

The aqueous dispersion of the PTFE or the fine powder of the PTFE is also preferably combined with a resin other than the PTFE to form a processing aid before use. The aqueous dispersion or the fine powder is suitable as a material of the PTFEs disclosed in JP H11-49912 A, U.S. Pat. No. 5,804, 654 B, JP H11-29679 A, and JP 2003-2980 A. The processing aid containing the aqueous dispersion or the fine powder is nothing inferior to the processing aids disclosed in the above documents.

The aqueous dispersion of the PEFE is also preferably mixed with an aqueous dispersion of a melt-fabricable fluororesin so that the components agglomerate to form co-agglomerated powder. The co-agglomerated powder is suitable as a processing aid.

Examples of the melt-fabricable fluororesin include FEP, PFA, ETFE, and ethylene/TFE/HFP copolymers (EFEPs). Preferred is FEP.

The aqueous dispersion also preferably contains a melt-fabricable fluororesin. Examples of the melt-fabricable fluororesin include FEP, PFA, ETFE, and EFEP. The aqueous dispersion containing the melt-fabricable fluororesin may be used as a coating material. The melt-fabricable fluororesin enables sufficient fusion of the PEFE particles, improving the film-formability and giving gloss to the resulting film.

The co-agglomerated powder may be added to a fluorine-free resin in the form of powder, pellets, or emulsion. In order to achieve sufficient mixing of the resins, the addition is preferably performed by a known method such as extrusion kneading or roll kneading under a shearing force.

The aqueous dispersion of the PEFE is also preferably used as a dust control agent. The dust control agent may be used in a method in which the dust control agent is mixed with a dust-generating substance and the mixture is affected by a compression-shear effect at a temperature of 20° C. to 200° C. to form fibrils of the PEFE, thereby reducing dust of dust-generating substances, such as the methods disclosed in JP 2827152 B and JP 2538783 B.

The aqueous dispersion of the PEFE can suitably be used for the dust control agent composition disclosed in WO 2007/004250, and can also suitably be used for a method of dust control treatment disclosed in WO 2007/000812.

The dust control agent can suitably be used for dust control treatment in the field of construction materials, the field of soil stabilizers, the field of solidification materials, the field of fertilizers, the field of reclamation of ash and hazardous materials, the field of explosion protection, or the field of cosmetics, or for pet toilet sand typified by cat litter.

The aqueous dispersion of the PEFE is also preferably used as a material for producing PEFE fibers by a dispersion spinning method. The dispersion spinning method is a method in which the aqueous dispersion of the PEFE and an aqueous dispersion of a matrix polymer are mixed and the mixture is extruded to form an intermediate fiber structure, and then the intermediate fiber structure is fired to decompose the matrix polymer and sinter the PEFE particles, thereby providing PEFE fibers.

The high-molecular-weight PTFE powder obtainable by the polymerization has stretchability and non melt-processability and is thus also useful as a material of a PTFE stretched article (PTFE porous article).

The stretched article in the form of a film (PTFE stretched film or PTFE porous film) can be formed by stretching by a known PTFE stretching method. Stretching enables easy formation of fibrils of high-molecular-weight PTFE, resulting in a PTFE porous article including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched article is a porous article having a high porosity, and can suitably be used as a filter material for a variety of microfiltration membranes such as air filters and chemical filters and a support member for polymer electrolyte membranes.

The PTFE stretched article is also useful as a material of products used in the textile field, the medical treatment field, the electrochemical field, the sealant field, the air filter field, the ventilation/internal pressure adjustment field, the liquid filter field, and the consumer goods field. The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), absorbent-attached filters (for HDD embedment), absorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as containers for freeze drying, ventilation materials for automobiles for electronic circuits and lamps, applications relating to containers such as container caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial drainage).

Consumer Goods Field

Examples of the applications in this field include clothes, cable guides (movable wires for motor bikes), clothes for motor cyclists, cast liners (medical supporters), filters for cleaners, bagpipes (musical instrument), cables (signal cables for guitars), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (extending articles), artificial blood vessels, catheters, general surgical operations (tissue reinforcing materials), products for head and neck (dura mater alternatives), oral health (tissue regenerative medicine), and orthopedics (bandages).

The fluoropolymer in which Af is a fluoropolymer segment consisting of a monomer unit derived from tetrafluoroethylene can be produced by the first production method of the disclosure including the step (i).

In an embodiment of the disclosure, Af is a fluoropolymer segment prepared by randomly copolymerizing a monomer unit derived from tetrafluoroethylene and at least one of a monomer unit derived from a monomer represented by the formula (1) or a monomer unit derived from a monomer represented by the formula (2).

The monomer represented by the formula (1) and the monomer represented by the formula (2) are the same as those described for the first production method of the disclosure.

In this case, Af preferably contains 50 mol % or more and less than 100 mol % of a polymerized unit based on TFE. The amount of the polymerized unit based on TFE is preferably 51 mol % or more, more preferably 55 mol % or more, still more preferably 60 mol % or more, particularly preferably 65 mol % or more. The amount of the polymerized unit based on TFE is preferably 99 mol % or less, more preferably 95 mol % or less, still more preferably 90 mol % or less.

When Af is the fluoropolymer segment prepared by randomly copolymerizing a monomer unit derived from TFE and at least one of a monomer unit derived from a monomer represented by the formula (1) or a monomer unit derived from a monomer represented by the formula (2), the fluoropolymer is a copolymer of TFE and at least one of a monomer represented by the formula (1) or a monomer represented by the formula (2). Examples thereof include melt-fabricable fluororesins such as a tetrafluoroethylene-hexafluoropropylene copolymer (FEP), a tetrafluoroethylene-perfluoro(alkyl vinyl ether) copolymer (PFA), an ethylene-tetrafluoroethylene copolymer (ETFE), and a TFE-VDF copolymer; and fluoroelastomers such as tetrafluoroethylene-propylene rubber (FEPM).

The FEP preferably has a monomer composition ratio (% by mass) of TFE:HFP=(60 to 95):(5 to 40), more preferably (85 to 92):(8 to 15). The FEP may be modified with a perfluoro(alkyl vinyl ether) as a third component within a range of 0.1 to 2% by mass of all monomers.

The FEP may be used in production of a variety of molded articles such as coating materials for electric wires, foamed electric wires, cables, and wires, tubes, films, sheets, and filaments.

The FEP preferably has a monomer composition ratio (mol %) of TFE:perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2$═$CFORf^4$, wherein $Rf^4$ is a C1-C6 perfluoroalkyl group.

The PFA can provide a variety of molded articles. Examples of the molded articles include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires. Preferred among these are tubes, pipes, tanks, connectors, and the like to be used for a variety of chemical reaction devices, semiconductor manufacturing devices, and acidic or alkaline chemical feeding devices each requiring chemical impermeability.

Also, the PFA alone or the PFA combined, if needed, with polyethersulfone, polyamide-imide, polyimide, or metal powder, is dissolved or dispersed in an organic solvent, and thereby a primer composition can be obtained. This primer composition can be used for a method for coating a metal surface with a fluororesin, the method including applying the primer composition to a metal surface, applying a melt-fabricable fluororesin composition to the resulting primer layer, and firing the melt-fabricable fluororesin composition layer together with the primer layer.

The ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer preferably includes any of perfluorobutyl ethylene, perfluorobutyl ethylene, 3,3,4,4,5,5,6,6,7,7,8,8,8-tridecafluorooct-1-ene, 2,3,3,4,4,5,5-heptafluoro-1-pentene ($CH_2$═$CFCF_2CF_2CF_2H$), and 2-trifluoromethyl-3,3,3-trifluoropropene ($(CF_3)_2C$═$CH_2$).

The ETFE may be extrusion-molded into a sheet. In other words, powder or pellets of ETFE in a molten state may be continuously extruded through a die and then cooled to provide a sheet-shaped molded article. The ETFE may be mixed with an additive.

The additive used as appropriate may be a known one. Specific examples thereof include ultraviolet absorbers, photostabilizers, antioxidants, infrared absorbers, flame retarders, flame-retardant filler, organic pigments, inorganic pigments, and dyes. In order to achieve excellent weather resistance, an inorganic additive is preferred.

The additive in the ETFE sheet is preferably present in an amount of 20% by mass or less, particularly preferably 10% by mass or less, relative to the whole mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, container inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

The TFE/VDF copolymer preferably has a monomer composition ratio (mol %) of TFE:VDF=(50 to 90):(10 to 50). The TFE/VDF copolymer may be modified with a third monomer within a range of 0 to 50 mol % of all monomers. The composition ratio thereof is preferably TFE:ethylene: third monomer=(50 to 85):(10 to 44.9):(0.1 to 10).

The third monomer is preferably a monomer, other than TFE and VDF, represented by the formula:

$$CX^{11}X^{12}{=}CX^{13}(CX^{14}X^{15})_{n11}X^{16}$$

(wherein $X^{11}$ to $X^{16}$ are the same as or different from each other and are each H, F, or C1, and n11 is an integer of 0 to 8) or a monomer represented by the formula: $CX^{21}X^{22}{=}CX^{23}{-}O(CX^{24}X^{25})_{n21}X^{26}$ (wherein $X^{21}$ to $X^{26}$ are the same as or different from each other and are each H, F, or C1, and n21 is an integer of 0 to 8).

The third monomer may be a fluorine-free ethylenic monomer. In order to maintain the heat resistance and the chemical resistance, the fluorine-free ethylenic monomer is preferably selected from ethylenic monomers having a carbon number of 6 or smaller. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

The TFE/VDF copolymer may be brought into contact with a nitrogen compound that can generate ammonia water, ammonia gas, or ammonia, and thereby may be amidated.

The TFE/VDF copolymer may also preferably be used as a material for providing TFE/VDF copolymer fibers by a spinning-drawing method. The spinning-drawing method is a method in which the TFE/VDF copolymer is melt-spun and then cool-solidified to provide undrawn yarn, and the undrawn yarn is passed through a heating cylinder and thereby drawn, so that TFE/VDF copolymer fibers are obtained.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and low-boiling-point general-purpose organic solvents such as solvent mixtures of any of these. The solution may be used as a binder for batteries.

The aqueous dispersion of the TFE/VDF copolymer may preferably be used to coat a porous substrate formed from a polyolefin resin to provide a composite porous film. The aqueous dispersion may also preferably contain inorganic particles and/or organic particles dispersed therein and be used to coat a porous substrate to provide a composite porous film. The composite porous film thereby obtained may be used as a separator for lithium secondary batteries.

The powder of the melt-fabricable fluororesin is suitably used as a powdery coating material. When applied to a substrate, the powdery coating material containing the melt-fabricable fluororesin powder can provide a film having a smooth surface. The melt-fabricable fluororesin powder having an average particle size of not smaller than 1 μm but smaller than 100 μm is particularly suitable as a powdery coating material used for electrostatic coating. The melt-fabricable fluororesin powder having an average particle size of 100 μm or greater and 1000 μm or smaller is particularly suitable as a powdery coating material used for rotational coating or rotational molding.

The melt-fabricable fluororesin powder can be produced by a method in which the melt-fabricable fluororesin obtained by the production method of the disclosure is dried and powdered.

The fluoroelastomer may be either a partially fluorinated elastomer or a perfluoroelastomer.

The partially fluorinated elastomer preferably includes at least one selected from the group consisting of tetrafluoroethylene (TFE)/propylene (Pr)-based fluoroelastomers and tetrafluoroethylene (TFE)/propylene/vinylidene fluoride (VdF)-based fluoroelastomers.

The tetrafluoroethylene/propylene-based fluoroelastomer is preferably a copolymer containing 45 to 70 mol % of tetrafluoroethylene, 55 to 30 mol % of propylene, and 0 to 5 mol % of a fluoromonomer giving a crosslinking site.

The fluoroelastomer may be a perfluoroelastomer. The perfluoroelastomer preferably includes at least one selected from the group consisting of perfluoroelastomers containing TFE, such as a copolymer containing TFE and a fluoromonomer represented by the formula (160), (130), or (140) and copolymers containing TFE, a fluoromonomer represented by the formula (160), (130), or (140), and a monomer giving a crosslinking site.

For the TFE/PMVE copolymer, the composition ratio thereof is preferably (50 to 90)/(10 to 55) (mol %), more preferably (55 to 80)/(20 to 45), still more preferably (55 to 70)/(30 to 45).

For the copolymer of TFE, PMVE, and a monomer giving a crosslinking site, the composition ratio thereof is preferably (50 to 89.9)/(10 to 49.9)/(0.01 to 4) (mol %), more preferably (55 to 77.9)/(20 to 49.9)/(0.1 to 3.5), still more preferably (55 to 69.8)/(30 to 44.8)/(0.2 to 3).

For the copolymer of TFE and a C4-C12 fluoromonomer represented by the formula (160), (130), or (140), the composition ratio thereof is preferably (50 to 90)/(10 to 50) (mol %), more preferably (60 to 88)/(12 to 40), still more preferably (65 to 85)/(15 to 35).

For the copolymer of TFE, a C4-C12 fluoromonomer represented by the formula (160), (130), or (140), and a monomer giving a crosslinking site, the composition ratio thereof is preferably (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

The fluoromonomer giving a crosslinking site preferably includes at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2CH_2I$, $CF_2{=}CFOCF_2CF_2CH_2I$, $CH_2{=}CFCF_2OCF(CF_3)CF_2OCF(CF_3)CN$, $CH_2{=}CFCF_2OCF(CF_3)CF_2OCF(CF_3)COOH$, $CH_2{=}CFCF_2OCF(CF_3)CF_2OCF(CF_3)CH_2OH$, $CH_2{=}CHCF_2CF_2I$, $CH_2{=}CH(CF_2)_2CH{=}CH_2$, $CH_2{=}CH(CF_2)_6CH{=}CH_2$, and $CF_2{=}CFO(CF_2)_5CN$, more preferably at least one selected from the group consisting of $CF_2{=}CFOCF_2CF(CF_3)OCF_2CF_2CN$ and $CF_2{=}CFOCF_2CF_2CH_2I$.

Each of the above copolymers having a composition ratio outside the above corresponding range tends to lose the properties as a rubber elastic article and to have properties close to those of a resin.

The perfluoroelastomer preferably includes at least one selected from the group consisting of copolymers of TFE, a fluoromonomer represented by the formula (140), and a fluoromonomer giving a crosslinking site, copolymers of TFE and a perfluorovinyl ether represented by the formula (140), copolymers of TFE and a fluoromonomer represented by the formula (160), and copolymers of TFE, a fluoromonomer represented by the formula (160), and a monomer giving a crosslinking site.

The perfluoroelastomer may also be any of the perfluoroelastomers disclosed in documents such as WO 97/24381, JP S61-57324 B, JP H04-81608 B, and JP H05-13961 B.

In order to achieve an excellent compression set at high temperature, the fluoroelastomer preferably has a glass transition temperature of −70° C. or higher, more preferably −60° C. or higher, still more preferably −50° C. or higher. In order to achieve good cold resistance, the glass transition temperature is preferably 5° C. or lower, more preferably 0° C. or lower, still more preferably −3° C. or lower.

The glass transition temperature can be determined as follows. Specifically, using a differential scanning calorimeter (DSC822e, available from Mettler-Toledo International Inc.), 10 mg of a sample is heated at a rate of 10° C./min to give a DSC curve, and the temperature is read at the intermediate point of two intersections between each of the extension lines of the base lines before and after the secondary transition of the DSC curve and the tangent line at the inflection point of the DSC curve.

In order to achieve good heat resistance, the fluoroelastomer preferably has a Mooney viscosity ML(1+20) of 30 or higher, more preferably 40 or higher, still more preferably 50 or higher, at 170° C. In order to achieve good processability, this Mooney viscosity is preferably 150 or lower, more preferably 120 or lower, still more preferably 110 or lower.

In order to achieve good heat resistance, the fluoroelastomer preferably has a Mooney viscosity ML(1+20) of 30 or higher, more preferably 40 or higher, still more preferably 50 or higher, at 140° C. In order to achieve good processability, this Mooney viscosity is preferably 180 or lower, more preferably 150 or lower, still more preferably 110 or lower.

In order to achieve good heat resistance, the fluoroelastomer preferably has a Mooney viscosity ML(1+10) of 10 or higher, more preferably 20 or higher, still more preferably 30 or higher, at 100° C. In order to achieve good processability, this Mooney viscosity is preferably 120 or lower, more preferably 100 or lower, still more preferably 80 or lower.

The Mooney viscosity can be determined using a Mooney viscometer MV2000E available from Alpha Technologies Inc. at 170° C., 140° C., or 100° C. in conformity with JIS K 6300.

The fluoroelastomer may be mixed with any additive such as a curing agent and filler and processed into a fluoroelastomer composition.

Examples of the curing agent include polyols, polyamines, organic peroxides, organotins, bis(aminophenol)tetraamine, and bis(thioaminophenol).

The fluoroelastomer composition contains the fluoroelastomer, and thus is free from an emulsifier and is excellent in that it is easily crosslinked during molding.

The fluoroelastomer may be molded to form a fluoroelastomer molded article. The molding may be performed by any method such as a known method using the aforementioned curing agent.

The fluoroelastomer molded article is suitable for seals, gaskets, electric wire coatings, hoses, tubes, laminates, and accessories, particularly parts for semiconductor manufacturing devices and automobile parts.

The fluoropolymer obtained through the step (ii) may be a modified PTFE containing 99.0% by mass or more of a monomer unit derived from TFE and 1.0% by mass or less of at least one of a monomer unit derived from a monomer represented by the formula (1) or a monomer unit derived from a monomer represented by the formula (2).

In this case, the combined amount of the monomer represented by the formula (1) and the monomer represented by the formula (2) is preferably 0.00001 to 1.0% by mass relative to the fluoropolymer obtained through the step (ii). The lower limit of the combined amount is more preferably 0.0001% by mass, still more preferably 0.001% by mass, further more preferably 0.005% by mass, particularly preferably 0.009% by mass. The upper limit thereof is preferably 0.90% by mass, more preferably 0.50% by mass, still more preferably 0.40% by mass, further more preferably 0.30% by mass, particularly preferably 0.10% by mass.

The fluoropolymer in which Af is a fluoropolymer segment prepared by randomly copolymerizing a monomer unit derived from tetrafluoroethylene and at least one of a monomer unit derived from a monomer represented by the formula (1) or a monomer unit derived from a monomer represented by the formula (2) can be produced by the first production method of the disclosure including the step (ii).

The fluoropolymers of the disclosure include a fluoropolymer represented by Bf-CRP (hereinafter, also referred to as “a second fluoropolymer of the disclosure”), wherein Bf is a fluoropolymer segment consisting of a monomer unit derived from tetrafluoroethylene, and CRP is represented by any of the following formulas (CRP1) to (CRP5), the formula (CRP1):

$$—SC(S)Z^{c11}$$

wherein $Z^{c11}$ is an alkyl group or an aryl group, the formula (CRP2):

$$—SC(S)SZ^{c12}$$

wherein $Z^{c12}$ is an alkyl group or an aryl group, the formula (CRP3):

$$—SC(S)SR^{c11}$$

wherein $R^{c11}$ is a monovalent organic group, the formula (CRP4):

$$—SC(S)NZ^{c13}_2$$

wherein (i) two $Z^{c13}$s are each independently an alkyl group, an aryl group, or a 4-pyridyl group or (ii) two $Z^{c13}$s bind to each other to form a heterocycle together with a N atom in the formula, and the formula (CRP5):

$$—SC(S)OZ^{c14}$$

wherein $Z^{c14}$ is an alkyl group or an aryl group,

Tetrafluoroethylene-based polymers have been difficult to be used for block copolymerization. The second fluoropolymer of the disclosure containing any of the specific groups described above at an end can be used for block copolymerization. Such a second fluoropolymer of the disclosure is useful as an intermediate to produce block copolymers.

Examples of $Z^{c11}$ in the formula (CRP1) include the above-described groups for $Z^{c1}$ in the formula (c1-1).

Examples of $Z^{c12}$ in the formula (CRP2) include the above-described groups for $Z^{c2}$ in the formula (c1-2).

Examples of $R^{c11}$ in the formula (CRP3) include the above-described groups for $R^{c}$ in the formula (c1-2').

Examples of $Z^{c13}$ in the formula (CRP4) include the above-described groups for $Z^{c3}$ and $Z^{c4}$ in the formula (c1-3).

Examples of $Z^{c14}$ in the formula (CRP5) include the above-described groups for $Z^{c5}$ in the formula (c1-4).

CRP5 is preferred among the CRPs in terms of polymerization rate.

The groups of the formulas (CRP1) to (CRP5) are groups derived from the chain transfer agents described for the first production method of the disclosure. In other words, the groups of the formulas (CRP1) to (CRP5) each constitute a portion in which part of a chain transfer agent is incorporated in a fluoropolymer (preferably a chain end of a fluoropolymer).

Bf is a fluoropolymer segment consisting of a monomer unit derived from tetrafluoroethylene. The second fluoropolymer of the disclosure is so-called PTFE. The properties of PTFE described for the first fluoropolymer of the disclosure can be all applied to the second fluoropolymer.

The second fluoropolymer of the disclosure can be produced by the first production method of the disclosure including the step (i).

The production methods of the disclosure also encompass a method for producing a fluoropolymer by solution polymerization or dispersion polymerization (hereinafter, also referred to as "a second production method of the disclosure"), the method including: in the presence of an initiator, a chain transfer agent, and a solvent, (iii) homopolymerizing tetrafluoroethylene, followed by block copolymerization with at least one of a monomer represented by the formula (1) or a monomer represented by the formula (2), or (iv) polymerizing at least one of a monomer represented by the formula (1) or a monomer represented by the formula (2), followed by block copolymerization with tetrafluoroethylene, the chain transfer agent including at least one selected from the group consisting of dithioester compounds, dithiocarbamate compounds, trithiocarbonate compounds, and xanthate compounds, the formula (1):

$$CF_2{=}CR^1R^2$$

wherein $R^1$ is H or F; $R^2$ is —Cl, —$R^a$, —$COOR^b$, —$OCOR^c$, —$CONR^d{}_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2{=}CR^3R^4$$

wherein $R^3$ is $R^g$, $CF_3$, or F; $R^4$ is —Cl, —$R^h$, —$COOR^i$, —$OCOR^j$, —$CONR^k{}_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

Tetrafluoroethylene-based polymers have been difficult to be used for block copolymerization. The inventors have found that block copolymerization can be used for TFE-based polymers by adopting solution polymerization or dispersion polymerization as a polymerization method and a specific compound as a chain transfer agent. Thereby, the second production method of the disclosure can be achieved. The second production method of the disclosure enables production of block copolymers based on a tetrafluoroethylene-based polymer.

The initiator, the chain transfer agent, the solvent, the monomer represented by the formula (1), and the monomer represented by the formula (2) in the second production method of the disclosure are the same as those in the first production method of the disclosure.

The homopolymerization of tetrafluoroethylene in the step (iii) may be performed as in the step (i) in the first production method of the disclosure. The homopolymerization of tetrafluoroethylene in the presence of a chain transfer agent can provide a polymer containing CRP at an end, like the first and second fluoropolymers of the disclosure described above. This enables block copolymerization of at least one of a monomer represented by the formula (1) or a monomer represented by the formula (2). The step (iii) is a step of homopolymerizing tetrafluoroethylene, followed by block copolymerization with at least one of a monomer represented by the formula (1) or a monomer represented by the formula (2), in the presence of an initiator, a chain transfer agent, and a solvent. The homopolymerization should be performed in the presence of an initiator, a chain transfer agent, and a solvent, but the block copolymerization is not required to be performed in the presence of an initiator, a chain transfer agent, and a solvent.

In the step (iii), the amount of the chain transfer agent may vary depending on the chain transfer constant of the compound used. The amount of the chain transfer agent is preferably 0.05 to 20 mol % relative to the tetrafluoroethylene. The amount of the chain transfer agent is preferably 0.06 mol % or more, more preferably 0.08 mol % or more, still more preferably 0.1 mol % or more. The amount is also preferably 15 mol % or less, more preferably 10 mol % or less, still more preferably 6.5 mol % or less.

In the step (iii), the amount of the initiator may vary depending on the compound used and is 5.0 to 1000 mol % relative to the chain transfer agent. The amount of the initiator is preferably 6.0 mol % or more, more preferably 8.0 mol % or more, still more preferably 10 mol % or more. The amount is also preferably 100 mol % or less, more preferably 50 mol % or less, still more preferably 30 mol % or less.

In the step (iii), the homopolymerization and the block copolymerization of at least one of a monomer represented by the formula (1) or a monomer represented by the formula (2) may be successively performed, or alternatively, the polymerizations may be performed as follows: a polymer is prepared by the homopolymerization and collected, the polymer is added to a solvent, and at least one of a monomer represented by the formula (1) or a monomer represented by the formula (2) is added thereto to perform polymerization.

The temperature of the block copolymerization of at least one of a monomer represented by the formula (1) or a monomer represented by the formula (2) in the step (iii) may be any temperature that enables block copolymerization and may be 0° C. to 150° C., for example. The temperature is preferably 20° C. to 130° C., more preferably 40° C. to 110° C.

The pressure of the block copolymerization of at least one of a monomer represented by the formula (1) or a monomer represented by the formula (2) in the step (iii) may be any pressure that enables block copolymerization and may be 0 to 9.8 MPaG, for example. The pressure is preferably 0.2 to 6.0 MPaG, more preferably 0.5 to 3.0 MPaG.

In the second production method of the disclosure, preferably, in the step (iii), the concentration of the at least one of a monomer represented by the formula (1) or a monomer represented by the formula (2) is 0.1 to 20 mol/L in the solvent. The concentration is more preferably 0.3 to 18 mol/L, still more preferably 0.5 to 15 mol/L.

The step (iii) may be performed once or more than once. A block copolymer containing multiple blocks (segments) can be produced by performing the step (iii) more than once.

The step (iv) is a step of polymerizing at least one of a monomer represented by the formula (1) or a monomer represented by the formula (2), followed by block copolymerization with tetrafluoroethylene in the presence of an initiator, a chain transfer agent, and a solvent. In the step (iv), the polymerization of at least one of a monomer represented by the formula (1) or a monomer represented by the formula (2) should be performed in the presence of an initiator, a chain transfer agent, and a solvent, but the block copolymerization is not required to be performed in the presence of an initiator, a chain transfer agent, and a solvent.

The polymerization of at least one of a monomer represented by the formula (1) or a monomer represented by the formula (2) in the presence of the chain transfer agent can provide a polymer having CRP at an end. This enables block copolymerization of tetrafluoroethylene. The block copolymerization of TFE preferably achieves block copolymerization of only TFE.

In the step (iv), the amount of the chain transfer agent may vary depending on the chain transfer constant of the compound used. The amount of the chain transfer agent is preferably 0.05 to 20 mol % relative to the combined amount of the monomer represented by the formula (1) and the monomer represented by the formula (2) and relative to tetrafluoroethylene. The amount of the chain transfer agent is more preferably 0.06 mol % or more, still more preferably 0.08 mol % or more, further more preferably 0.1 mol % or more. The amount is also more preferably 15 mol % or less, still more preferably 10 mol % or less, further more preferably 6.5 mol % or less.

In the step (iv), the amount of the initiator may vary depending on the compound used and is 5.0 to 1000 mol % relative to the chain transfer agent. The amount of the initiator is preferably 6.0 mol % or more, more preferably 8.0 mol % or more, still more preferably 10 mol % or more. The amount is also preferably 100 mol % or less, more preferably 50 mol % or less, still more preferably 30 mol % or less.

The temperature of the polymerization of at least one of a monomer represented by the formula (1) or a monomer represented by the formula (2) in the step (iv) may be 0° C. to 150° C., for example. The temperature is preferably 20° C. to 130° C., more preferably 40° C. to 110° C.

The pressure of the polymerization of at least one of a monomer represented by the formula (1) or a monomer represented by the formula (2) in the step (iv) may be 0 to 9.8 MPaG, for example. The pressure is preferably 0.2 to 6.0 MPaG, more preferably 0.5 to 3.0 MPaG.

In the step (iv), the polymerization of at least one of a monomer represented by the formula (1) or a monomer represented by the formula (2) and the block copolymerization of TFE may be successively performed, or alternatively, the polymerizations may be performed as follows: a polymer is prepared by polymerizing at least one of a monomer represented by the formula (1) or a monomer represented by the formula (2) and collected, the polymer is added to a solvent, and TFE is added thereto to perform polymerization.

The temperature of the block copolymerization of tetrafluoroethylene in the step (iv) may be 10° C. to 150° C., for example. The temperature is preferably 20° C. to 130° C., more preferably 40° C. to 110° C.

The pressure of the block copolymerization of tetrafluoroethylene in the step (iv) may be 0.05 to 5.0 MPaG, for example. The pressure is preferably 0.2 to 3.5 MPaG, more preferably 0.5 to 1.2 MPaG.

The step (iv) may be performed once or more than once. A block copolymer containing multiple blocks (segments) can be produced by performing the step (iv) more than once.

An example of the fluoropolymer obtainable by the second production method of the disclosure is a third fluoropolymer of the disclosure described below.

The fluoropolymers of the disclosure encompass a fluoropolymer including:

a segment A containing a monomer unit derived from tetrafluoroethylene; and a segment B containing at least one of a monomer unit derived from a monomer represented by the formula (1) or a monomer unit derived from a monomer represented by the formula (2) (hereinafter, also referred to as "a third fluoropolymer of the disclosure"), the formula (1):

$$CF_2{=}CR^1R^2$$

wherein $R^1$ is H or F; $R^2$ is —Cl, —$R^a$, —$COOR^b$, —$COOR^c$, —$CONR^d_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2{=}CR^3R^4$$

wherein $R^3$ is $R^g$, $CF_3$, or F; $R^4$ is —Cl, —$R^h$, —$COOR^i$, —$OCOR^j$, —$CONR^k_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

The segment A contains a monomer unit derived from TFE. Preferably, the segment A consists of a monomer unit derived from TFE. The segment A is a polymer segment consisting of a TFE homopolymer (PTFE). The properties of the above-described PTFE can be all applied to the segment A.

The segment B should contain at least one of a monomer unit derived from a monomer represented by the formula (1) or a monomer unit derived from a monomer represented by the formula (2). In particular, the segment B preferably includes at least one selected from the group consisting of HFP, CTFE, VDF, vinyl fluoride, trifluoroethylene, fluoroalkyl vinyl ethers, trifluoropropylene, pentafluoropropylene, trifluorobutene, tetrafluoroisobutene, hexafluoroisobutene, vinyl esters, (meth)acrylic acid esters, alkenes, amide bond-containing fluorine-free monomers, fluoroalkyl ethylenes, and fluorine-containing acrylate monomers, preferably includes at least one selected from the group consisting of HFP, CTFE, VDF, fluoroalkyl vinyl ethers, trifluoropropylene, pentafluoropropylene, trifluorobutene, tetrafluoroisobutene, hexafluoroisobutene, vinyl esters, (meth)acrylic acid esters, N-acrylamide compounds, alkenes, N-vinylamide compounds, N-vinyl lactam compounds, fluoroalkyl ethylenes, and fluorine-containing acrylate monomers, still more preferably includes at least one selected from the group consisting of HFP, VDF, perfluoro(methyl vinyl ether), perfluorosulfonyl vinyl ether, ethylene, N-vinylamide compounds, N-vinyl lactam compounds, and vinyl acetate, particularly preferably includes at least one selected from the group consisting of HFP, VDF, perfluoro(methyl vinyl ether), perfluorosulfonyl vinyl ether, ethylene, N-vinylamide compounds, N-vinylpyrrolidone, and vinyl acetate.

The segment B may include any polymer that contains at least one of a polymerized unit based on a monomer represented by the formula (1) or a polymerized unit based on a monomer represented by the formula (2). For example, a polyvinyl ester such as polyvinyl acetate, a polyvinylamide such as poly(N-vinylpyrrolidone), or a polyfluoroolefin such as PVDF is particularly preferred.

The third fluoropolymer of the disclosure contains the segment A and the segment B. The third fluoropolymer of the disclosure preferably has a structure represented by the following formula:

-A-L-B— wherein A is the segment A, B is the segment B, and L is a linking group.

L may be a single bond or a divalent organic group. Examples of the divalent organic group for L include an alkylene group and an oxyalkylene group.

Preferably, L is a single bond.

The third fluoropolymer of the disclosure preferably contains a -A-B— structure in which the segment A and the segment B bind to each other via a single bond.

The expression "the segment A and the segment B bind to each other via a single bond" means that a monomer unit (e.g., a monomer unit derived from TFE) constituting an end portion of the segment A directly binds to a monomer unit (e.g., at least one of a monomer unit derived from a monomer represented by the formula (1) or a monomer unit derived from a monomer represented by the formula (2)) constituting an end portion of the segment B. This structure can be achieved by the second production method of the disclosure.

The third fluoropolymer of the disclosure should have at least one -A-L-B— structure and may have two or three or more of the structures. In other words, the third fluoropolymer of the disclosure should include at least one segment A and at least one segment B which are bind to each other via L, preferably via a single bond, and may have a structure in which two or three or more -A-L-B— units are repeated. For example, the third fluoropolymer may have a structure such as -A-L-B—, —B-L-A-, -A-L-B-L-A-, —B-L-A-L-B—, -A-L-B-L-A-L-B—, or —B-L-A-L-B-L-A-.

In the third fluoropolymer of the disclosure, the segment A and the segment B are present in a mass ratio (A/B) of 99/1 to 1/99.

The third fluoropolymer of the disclosure can have the properties of both the segment A containing a monomer unit derived from a TFE-derived monomer and the segment B containing at least one of a monomer unit derived from a monomer represented by the formula (1) or a monomer unit derived from a monomer represented by the formula (2). Such a fluoropolymer is expected to be used for a compatibilizing agent that is used to provide fluororesin composites or adhesives, for example.

The third fluoropolymer of the disclosure can also be used for the applications described for the first and second fluoropolymers of the disclosure.

The disclosure relates to a method for producing a fluoropolymer by solution polymerization or dispersion polymerization, the method including: in the presence of an initiator, a chain transfer agent, and a solvent, (i) homopolymerizing tetrafluoroethylene; or (ii) randomly copolymerizing tetrafluoroethylene and at least one of a monomer represented by the following formula (1) or a monomer represented by the following formula (2), the chain transfer agent including at least one selected from the group consisting of dithioester compounds, dithiocarbamate compounds, trithiocarbonate compounds, and xanthate compounds, the fluoropolymer containing 50 to 100 mol % of a polymerized unit based on the tetrafluoroethylene, the formula (1):

$$CF_2{=}CR^1R^2$$

wherein $R^1$ is H or F; $R^2$ is —Cl, —$R^a$, —$COOR^b$, —$OCOR^c$, —$CONR^d_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2{=}CR^3R^4$$

wherein $R^3$ is $R^g$, $CF_3$, or F; $R^4$ is —Cl, —$R^h$, —$COOR^i$, —$OCOR^j$, —$CONR^k_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

The disclosure also relates to a fluoropolymer represented by Af-CRP, wherein Af is a fluoropolymer segment consisting of a monomer unit derived from tetrafluoroethylene or a fluoropolymer segment prepared by randomly copolymerizing a monomer unit derived from tetrafluoroethylene and at least one of a monomer unit derived from a monomer represented by the formula (1) or a monomer unit derived from a monomer represented by the formula (2), and CRP is represented by any of the following formulas (CRP1) to (CRP5), the fluoropolymer containing 50 to 100 mol % of a polymerized unit based on the tetrafluoroethylene, the formula (CRP1):

$$—SC(S)Z^{c11}$$

wherein $Z^{c11}$ is an alkyl group or an aryl group, the formula (CRP2):

$$—SC(S)SZ^{c12}$$

wherein $Z^{c12}$ is an alkyl group or an aryl group, the formula (CRP3):

$$—SC(S)SR^{c11}$$

wherein $R^{c11}$ is a monovalent organic group, the formula (CRP4):

$$—SC(S)NZ^{c13}{}_2$$

wherein (i) two $Z^{c13}$s are each independently an alkyl group, an aryl group, or a 4-pyridyl group or (ii) two $Z^{c13}$s bind to each other to form a heterocycle together with a N atom in the formula, and the formula (CRP5):

$$—SC(S)OZ^{c14}$$

wherein $Z^{c14}$ is an alkyl group or an aryl group, the formula (1):

$$CF_2═CR^1R^2$$

wherein $R^1$ is H or F; $R^2$ is —Cl, —$R^a$, —$COOR^b$, —$COOR^c$, —$CONR^d{}_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2═CR^3R^4$$

wherein $R^3$ is $R^g$, $CF_3$, or F; $R^4$ is —Cl, —$R^h$, —$COOR^i$, —$OCOR^j$, —$CONR^k{}_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

The disclosure also relates to a fluoropolymer represented by Bf-CRP, wherein Bf is a fluoropolymer segment consisting of a monomer unit derived from tetrafluoroethylene, and CRP is represented by any of the following formulas (CRP1) to (CRP5), the formula (CRP1):

$$—SC(S)Z^{c11}$$

wherein $Z^{c11}$ is an alkyl group or an aryl group, the formula (CRP2):

$$—SC(S)SZ^{c12}$$

wherein $Z^{c12}$ is an alkyl group or an aryl group, the formula (CRP3):

$$—SC(S)SR^{c11}$$

wherein $R^{c11}$ is a monovalent organic group, the formula (CRP4):

$$—SC(S)NZ^{c13}{}_2$$

wherein (i) two $Z^{c13}$s are each independently an alkyl group, an aryl group, or a 4-pyridyl group or (ii) two $Z^{c13}$s bind to each other to form a heterocycle together with a N atom in the formula, and the formula (CRP5):

$$—SC(S)OZ^{c14}$$

wherein $Z^{c14}$ is an alkyl group or an aryl group.

The disclosure provides a method for producing a fluoropolymer by solution polymerization or dispersion polymerization, the method including: in the presence of an initiator, a chain transfer agent, and a solvent, (iii) homopolymerizing tetrafluoroethylene, followed by block copolymerization with at least one of a monomer represented by the formula (1) or a monomer represented by the formula (2), or (iv) polymerizing at least one of a monomer represented by the formula (1) or a monomer represented by the formula (2), followed by block copolymerization with tetrafluoroethylene, the chain transfer agent including at least one selected from the group consisting of dithioester compounds, dithiocarbamate compounds, trithiocarbonate compounds, and xanthate compounds, the formula (1):

$$CF_2═CR^1R^2$$

wherein $R^1$ is H or F; $R^2$ is —Cl, —$COOR^b$, —$COOR^c$, —$CONR^d{}_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2═CR^3R^4$$

wherein $R^3$ is $R^g$, $CF_3$, or F; $R^4$ is —Cl, —$R^h$, —$COOR^i$, —$OCOR^j$, —$CONR^k{}_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

Preferably, the solvent is a non-fluorine-based organic solvent or a fluorine-based organic solvent.

Preferably, in the step (iii), a concentration of the at least one of a monomer represented by the formula (1) or a monomer represented by the formula (2) is 0.1 to 20 mol/L in the solvent.

The disclosure also provides a fluoropolymer including:

a segment A containing a monomer unit derived from tetrafluoroethylene; and a segment B containing at least one of a monomer unit derived from a monomer represented by the formula (1) or a monomer unit derived from a monomer represented by the formula (2), the formula (1):

$$CF_2{=}CR^1R^2$$

wherein $R^1$ is H or F; $R^2$ is —Cl, —$R^a$, —$COOR^b$, —$COOR^c$, —$CONR^d_2$, —CN, —$COR^e$, or —$Rf^a$; $R^a$, $R^b$, $R^c$, $R^d$, and $R^e$ are the same as or different from each other and are each H or a substituent; $Rf^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2{=}CR^3R^4$$

wherein $R^3$ is $R^g$, $CF_3$, or F; $R^4$ is —Cl, —$R^h$, —$COOR^i$, —$OCOR^j$, —$CONR^k_2$, —CN, —$COR^m$, or $Rf^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring.

Preferably, the segment A consists of a monomer unit derived from tetrafluoroethylene.

Preferably, the segment B includes at least one monomer unit based on a monomer selected from the group consisting of hexafluoropropylene, chlorotrifluoroethylene, vinylidene fluoride, vinyl fluoride, trifluoroethylene, fluoroalkyl vinyl ethers, trifluoropropylene, pentafluoropropylene, trifluorobutene, tetrafluoroisobutene, hexafluoroisobutene, vinyl esters, (meth)acrylic acid esters, acrylamide, alkenes, vinylamide, fluoroalkylethylenes, and fluorine-containing acrylate monomers.

Preferably, the segment B contains polyvinyl ester, polyvinylamide, or polyvinylidene fluoride.

Preferably, the segment A and the segment B are present in a mass ratio (A/B) of 99/1 to 1/99.

EXAMPLES

The invention is described in more detail below with reference to, but not limited to, examples.

The parameters in the examples were determined by the following methods.

Condition of $^1$H-NMR analysis (solution): 400 MHz (tetramethylsilane=0 ppm)

Condition of $^{19}$F-NMR analysis (solution): 400 MHz (trichlorofluoromethane=0 ppm)

Condition of $^{19}$F-NMR analysis (solid): 282 MHz, rotation speed of 30 kHz ($CF_2CF_2CF_{2=-120}$ ppm)

Example 1

A reaction vessel was charged with 0.031 g of t-butylperoxypivalate as a polymerization initiator, 0.37 g of O-ethyl-S-(1-methoxycarbonyl)ethyldithiocarbonate as a chain transfer agent, 39 mL of ASAHIKLIN AK-225 (trade name, available from AGC) as a solvent, and 2.3 g of tetrafluoroethylene. The contents were heated to 80° C. under stirring. After the completion of the reaction, the reaction vessel was cooled, the gas was discharged, and a polymer dispersion was collected. The dispersion was filtered and the dispersoid was dried. Thereby, 1.8 g of a white solid was obtained. Solid-state $^{19}$F-NMR analysis showed a peak derived from —$CF_2$—S— at −85 ppm based on a peak derived from the $CF_2$ chain at −120 ppm and confirmed that a section of the chain transfer agent (—$SC(S)OC_2H_5$) was introduced into an end of the polymer. The degree of polymerization was estimated to be 16 from the ratio between the integral value of the peak at −120 ppm and the integral value of the peak at −85 ppm.

Solid $^{19}$F-NMR $\delta_F$ ppm: −73, −85 ($CF_2S$), −105 to −125 ($CH(CH_3)CF_2$, $CF_2CF_2CF_2$), −128 ($CF_2CF_2H$), −136 ($CF_2H$)

Example 2

A reaction vessel was charged with 0.016 g of AIBN, 2.0 g of the polymer of Example 1, 5 mL of ethyl acetate, and 5.0 g of vinyl acetate. The contents were heated to 65° C. under stirring. Thereafter, the polymer solution was collected. The polymer solution was filtered to remove insoluble matters, and the filtrate was subjected to reprecipitation to remove homopolymers. Thereby, 5.8 g of a target block copolymer was obtained. $^{19}$F-NMR analysis confirmed the disappearance of the peak derived from —$CF_2$—S— at −85 ppm, and $^1$H-NMR analysis confirmed the presence of a structure created by polymerization of vinyl acetate (1.5 to 2.3 ppm, 4.7 to 5.1 ppm).

$^{19}$F-NMR ($CDCl_3$) $\delta_F$ ppm: −105 to −125 ($CF_2CH_2$, $CH(CH_3)CF_2$, $CF_2CF_2CF_2$)

Example 3

A reaction vessel was charged with 0.027 g of t-butylperoxypivalate as a polymerization initiator, 0.12 g of O-ethyl-S-(1-methoxycarbonyl)ethyldithiocarbonate as a chain transfer agent, 15 mL of ASAHIKLIN AK-225 (trade name, available from AGC) as a solvent, 0.7 g of vinyl acetate, and 1.9 g of tetrafluoroethylene. The contents were heated to 70° C. under stirring. After the completion of the reaction, the reaction vessel was cooled, the gas was discharged, and a polymer dispersion was collected. The dispersion was filtered and the dispersoid was dried. Thereby, 1.1 g of a white solid was obtained. Solid-state $^{19}$F-NMR analysis showed a peak derived from the $CF_2$ chain and a peak derived from the copolymerization within −100 ppm to −130 ppm and a peak derived from —$CF_2$—S— at −85 ppm and confirmed that a section of the chain transfer agent (—SC(S)$OC_2H_5$) was introduced into an end of the polymer. Solid $^{19}$F-NMR $\delta_F$ ppm: −73, −85 ($CF_2S$), −100 to −130 ($CF_2CH_2$, CH(OAc)$CF_2$, $CH(CH_3)CF_2$, $CF_2CF_2CF_2$, $CF_2CF_2H$), −136 ($CF_2H$)

Example 4

A reaction vessel was charged with 0.027 g of t-butylperoxypivalate as a polymerization initiator, 0.12 g of O-ethyl-S-(1-methoxycarbonyl)ethyldithiocarbonate as a chain transfer agent, 15 mL of ASAHIKLIN AK-225 (trade name, available from AGC) as a solvent, 1.5 g of tetrafluoroethylene, and 0.45 g of vinylidene fluoride. The contents were heated to 70° C. under stirring. After the completion of the reaction, the reaction vessel was cooled, the gas was discharged, and a polymer dispersion was collected. The dispersion was filtered and the dispersoid was dried. Thereby, 1.0 g of a white solid was obtained. Solid-state $^{19}$F-NMR analysis showed a peak derived from the $CF_2$ chain and a peak derived from the copolymerization within −100 ppm to −125 ppm and a peak derived from —$CF_2$—S— at −85 ppm and confirmed that a section of the chain transfer agent (—SC(S)$OC_2H_5$) was introduced into an end of the polymer.

Solid $^{19}$F-NMR $\delta_F$ ppm: −73, −85 ($CF_2S$), −95 ($CH_2CF_2CH_2$), −100 to −125 ($CF_2CF_2CH_2$, $CH(CH_3)CF_2$, $CF_2CF_2CF_2$), −128 ($CF_2CF_2H$), −136 ($CF_2H$)

Example 5

A reaction vessel was charged with 0.027 g of t-butylperoxypivalate as a polymerization initiator, 0.12 g of O-ethyl-S-(1-methoxycarbonyl)ethyldithiocarbonate as a chain transfer agent, 15 mL of ASAHIKLIN AK-225 (trade name, available from AGC) as a solvent, 0.9 g of N-vinylpyrrolidone, and 1.9 g of tetrafluoroethylene. The contents were heated to 70° C. under stirring. After the completion of the reaction, the reaction vessel was cooled, the gas was discharged, and a polymer dispersion was collected. The dispersion was filtered and the dispersoid was dried. Thereby, 1.2 g of a white solid was obtained. Solid-state $^{19}$F-NMR analysis showed a peak derived from the $CF_2$ chain and a peak derived from the copolymerization within −110 ppm to −125 ppm and a peak derived from —$CF_2$—S— at −85 ppm and confirmed that a section of the chain transfer agent (—SC(S)$OC_2H_5$) was introduced into an end of the polymer.

Solid $^{19}$F-NMR $\delta_F$ ppm: −73, −85 ($CF_2S$), −105 to −125 ($CF_2CH_2$, $CH(NC_4H_6O)CF_2$, $CH(CH_3)CF_2$, $CF_2CF_2CF_2$), −128 ($CF_2CF_2H$), −136 ($CF_2H$)

Example 6

A reaction vessel was charged with 0.024 g of t-butylperoxypivalate, 2.0 g of the polymer of Example 1, 60 mL of dimethyl carbonate, and 19 g of vinylidene fluoride. The contents were heated to 70° C. under stirring. After the completion of the reaction, the reaction vessel was cooled, the gas was discharged, and a polymer dispersion was collected. The dispersion was dried and washed to remove homopolymers. Thereby, 10 g of a target block copolymer was obtained. Solid $^{19}$F-NMR analysis confirmed the disappearance of the peak derived from —$CF_2$—S— at −85 ppm and the presence of a structure created by polymerization of vinylidene fluoride (−90 to −100 ppm, −110 to −120 ppm). Solid $^{19}$F-NMR $\delta_F$ ppm: −90 to −100 ($CH_2CF_2CH_2$), −110 to −125 ($CF_2CF_2CH_2$, $CF_2CF_2CF_2$)

Example 7

A reaction vessel was charged with 0.024 g of t-butylperoxypivalate, 2.0 g of the polymer of Example 1, 60 mL of ethyl acetate, 6.6 g of vinylidene fluoride, and 12 g of hexafluoropropylene. The contents were heated to 60° C. under stirring. After the completion of the reaction, the reaction vessel was cooled, the gas was discharged, and a polymer dispersion was collected. The dispersion was dried and washed to remove homopolymers. Thereby, 12 g of a target block copolymer was obtained. Solid $^{19}$F-NMR analysis confirmed the disappearance of the peak derived from —$CF_2$—S— at −85 ppm and the presence of a structure created by copolymerization of vinylidene fluoride and hexafluoropropylene (−100 to −120 ppm).

Solid $^{19}$F-NMR $\delta_F$ ppm: −70 to −80 ($CF(CF_3)$), −90 to −100 ($CH_2CF_2CH_2$), −100 to −125 ($CH_2CF_2CF_2$, $CF_2CF(CF_3)$, $CF_2CF_2CF_2$), −185 ($CF(CF_3)$)

Example 8

A reaction vessel was charged with 0.024 g of t-butylperoxypivalate, 2.0 g of the polymer of Example 1, 60 mL of acetone, and 6.5 g of N-vinylpyrrolidone. The contents were heated to 70° C. under stirring. After six hours, the polymer solution was collected. The polymer solution was filtered to remove insoluble matters and washed to remove homopolymers. Thereby, 6.9 g of a target block copolymer was obtained. $^{19}$F-NMR analysis confirmed the disappearance of the peak derived from —$CF_2$—S— at −85 ppm, and $^1$H-NMR analysis confirmed the presence of a structure created by polymerization of N-vinylpyrrolidone (1.2 to 2.6 ppm, 3.0 to 4.4 ppm). $^{19}$F-NMR ($CDCl_3$) ET ppm: −105 to −125 ($CF_2CH_2$, $CH(CH_3)CF_2$, $CF_2CF_2CF_2$)

What is claimed is:

1. A fluoropolymer comprising:

a segment A consisting of a monomer unit of tetrafluoroethylene; and a segment B containing at least one of a monomer unit derived from a monomer represented by the formula (1) or a monomer unit derived from a monomer represented by the formula (2), the formula (1):

$$CF_2{=}CR^1R^2$$

wherein $R^1$ is H; $R^2$ is —Cl, —$R^a$, —COOR$^b$, —OCOR$^c$, —CONR$^d_2$, —CN, —COR$^e$, or —Rf$^a$; $R^a$, $R^b$, $R^c$, $R^d$, and $R^e$ are the same as or different from each other and are each H or a substituent; Rf$^a$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^1$ and $R^2$ optionally bind to each other to form a ring, the formula (2):

$$CH_2{=}CR^3R^4$$

wherein $R^3$ is $R^g$, $CF_3$, or F; $R^4$ is —Cl, —$R^h$, —COOR$^i$, —OCOR$^j$, —CONR$^k_2$, —CN, —COR$^m$, or Rf$^c$; $R^g$ and $R^h$ are the same as or different from each other and are each H, an optionally substituted hydrocarbon group, or an optionally substituted heterocyclic group; $R^i$, $R^j$, $R^k$, and $R^m$ are the same as or different from each other and are each H or a substituent; $Rf^c$ is the same as or different from each other and is an optionally substituted fluorine-containing alkyl group, an optionally substituted fluorine-containing vinyl group, or an optionally substituted fluorine-containing alkoxy group, each group optionally containing an oxygen atom between carbon atoms; and $R^3$ and $R^4$ optionally bind to each other to form a ring, wherein when the segment B contains a monomer unit of vinylidene fluoride (VDF), the segment B consists of the monomer unit of vinylidene fluoride (VDF).

2. The fluoropolymer according to claim 1, wherein the segment B comprises at least one monomer unit based on a monomer selected from the group consisting of vinylidene fluoride, vinyl fluoride, fluoroalkyl vinyl ethers, trifluoropropylene, trifluorobutene, tetrafluoroisobutene, hexafluoroisobutene, vinyl esters, (meth)acrylic acid esters, acrylamide, alkenes, vinylamide, fluoroalkylethylenes, and fluorine-containing acrylate monomers.

3. The fluoropolymer according to claim 1, wherein the segment B comprises polyvinyl ester, polyvinylamide, or polyvinylidene fluoride.

4. The fluoropolymer according to claim 1, wherein the segment A and the segment B are present in a mass ratio (A/B) of 99/1 to 1/99.

5. A method for producing the fluoropolymer according to claim 1 by solution polymerization or dispersion polymerization, the method comprising: in the presence of an initiator, a chain transfer agent, and a solvent, (iii) homopolymerizing tetrafluoroethylene, followed by block copolymerization with at least one of the monomer represented by the formula (1) or the monomer represented by the formula (2), or (iv) polymerizing at least one of the monomer represented by the formula (1) or the monomer represented by the formula (2), followed by block copolymerization with tetrafluoroethylene, the chain transfer agent including at least one selected from the group consisting of dithioester compounds, dithiocarbamate compounds, trithiocarbonate compounds, and xanthate compounds.

6. The production method according to claim 5, wherein the solvent is a non-fluorine-based organic solvent or a fluorine-based organic solvent.

7. The production method according to claim 5, wherein in the step (iii), a concentration of the at least one of a monomer represented by the formula (1) or a monomer represented by the formula (2) is 0.1 to 20 mol/L in the solvent.

* * * * *